(12) United States Patent
Elsey et al.

(10) Patent No.: US 7,499,537 B2
(45) Date of Patent: Mar. 3, 2009

(54) TECHNIQUE FOR PROVIDING PERSONALIZED INFORMATION AND COMMUNICATIONS SERVICES

(75) Inventors: Nicholas J. Elsey, West Linn, OR (US); Michael A. Kepler, Aloha, OR (US); Timothy A. Timmins, Tigard, OR (US); Michael T. Samudio, Tigard, OR (US)

(73) Assignee: Grape Technology Group, Inc., Bethlehem, PA (US)

( * ) Notice: Subject to any disclaimer, the term of this patent is extended or adjusted under 35 U.S.C. 154(b) by 0 days.

(21) Appl. No.: 10/896,380

(22) Filed: Jul. 21, 2004

(65) Prior Publication Data

US 2004/0258231 A1 Dec. 23, 2004

Related U.S. Application Data

(60) Division of application No. 09/865,230, filed on May 25, 2001, and a continuation-in-part of application No. 09/441,656, filed on Nov. 12, 1999, now Pat. No. 6,870,921.

(60) Provisional application No. 60/257,913, filed on Dec. 21, 2000.

(51) Int. Cl.
*H04M 3/42* (2006.01)
(52) U.S. Cl. ............... 379/218.01; 379/88.19; 379/218.02; 707/9; 709/229; 726/2; 726/27
(58) Field of Classification Search ............ 379/88.19, 379/210.01, 201.04, 218.01, 218.02; 707/9; 709/229; 726/2, 27
See application file for complete search history.

(56) References Cited

U.S. PATENT DOCUMENTS 4,551,581 A 11/1985 Doughty
4,582,956 A 4/1986 Doughty (Continued)

*Primary Examiner*—Fan Tsang
*Assistant Examiner*—Hemant Patel
(74) *Attorney, Agent, or Firm*—Sofer & Haroun, LLP

(57) ABSTRACT

A user may utilize a communication device, e.g., a wireless phone, mobile device or personal digital assistant (PDA), to contact an information/call center where an operator provides personalized information and communications services to the user in accordance with the invention. Such services include, e.g., providing listing information, contacts information, appointments information, etc. To provide effective connectivity, for example, when a user locates a phone number in his/her private directory using a web browser, the user may utilize a direct connect feature of the invention to initiate a phone call to the desired number over the Internet. In addition, the invention allows for delivery of the appointments information to the user not only via voice connection, but also SMS, email, facsimile, PDA, etc. It also allows for rendering a calendaring service in combination with such services as a TeleConcierge® service which helps the user to plan a future event, e.g., making a restaurant reservation. An appointment record concerning the future event is automatically incorporated into the user's calendar once it is successfully planned. To personalize the services, at least one profile associated with the user is used which specifies the subscribed services and the preferred ways of receiving them. For example, the profile may specify use of a special skilled operator, methods of delivery of information to the user, etc.

33 Claims, 15 Drawing Sheets

U.S. PATENT DOCUMENTS

| | | | | |
|---|---|---|---|---|
| 4,969,185 A | * | 11/1990 | Dorst et al. | 379/210.01 |
| 5,058,152 A | * | 10/1991 | Solomon et al. | 379/67.1 |
| 5,163,083 A | * | 11/1992 | Dowden et al. | 379/88.03 |
| 5,450,476 A | * | 9/1995 | D'Apuzzo et al. | 379/88.23 |
| 5,613,006 A | * | 3/1997 | Reese | 379/67.1 |
| 5,644,711 A | * | 7/1997 | Murphy | 726/2 |
| 5,809,114 A | * | 9/1998 | Solomon et al. | 379/88.19 |
| 5,835,570 A | * | 11/1998 | Wattenbarger | 379/88.03 |
| 5,854,836 A | * | 12/1998 | Nimmagadda | 379/221.13 |
| 5,873,032 A | | 2/1999 | Cox et al. | |
| 5,933,778 A | | 8/1999 | Buhrmann et al. | |
| 5,943,417 A | | 8/1999 | Cox et al. | |
| 5,966,437 A | | 10/1999 | Cox et al. | |
| 6,058,169 A | * | 5/2000 | Bramnick et al. | 379/100.01 |
| 6,064,878 A | * | 5/2000 | Denker et al. | 455/415 |
| 6,073,023 A | * | 6/2000 | Tirabassi et al. | 455/518 |
| 6,219,410 B1 | * | 4/2001 | Sun | 379/156 |
| 6,253,203 B1 | * | 6/2001 | O'Flaherty et al. | 707/9 |
| 6,269,369 B1 | * | 7/2001 | Robertson | 707/10 |
| 6,310,944 B1 | * | 10/2001 | Brisebois et al. | 379/142.01 |
| 6,324,271 B1 | * | 11/2001 | Sawyer et al. | 379/142.05 |
| 6,404,876 B1 | * | 6/2002 | Smith et al. | 379/218.01 |
| 6,404,884 B1 | * | 6/2002 | Marwell et al. | 379/265.13 |
| 6,483,910 B1 | * | 11/2002 | Council | 379/127.01 |
| 6,515,695 B1 | * | 2/2003 | Sato et al. | 348/14.08 |
| 6,542,596 B1 | * | 4/2003 | Hill et al. | 379/207.02 |
| 6,665,389 B1 | * | 12/2003 | Haste, III | 379/196 |
| 6,714,536 B1 | * | 3/2004 | Dowling | 370/356 |
| 6,738,461 B2 | * | 5/2004 | Trandal et al. | 379/142.02 |
| 6,785,379 B1 | * | 8/2004 | Rogers et al. | 379/265.02 |
| 6,798,772 B2 | * | 9/2004 | Bergman et al. | 370/354 |
| 6,820,083 B1 | * | 11/2004 | Nagy et al. | 707/9 |
| 6,853,636 B1 | * | 2/2005 | Merchant | 370/352 |
| 2001/0049617 A1 | | 12/2001 | Berenson et al. | |
| 2002/0032589 A1 | | 3/2002 | Shah | |
| 2002/0118800 A1 | * | 8/2002 | Martinez et al. | 379/67.1 |

* cited by examiner

FIG. 5

| | 1007 | 1005 | | | 505 | 507 |

| 512 | NAME | HOME | BUSINESS | MOBILE | | |
|---|---|---|---|---|---|---|
| | BOB ☎ | 709-166-5555 | 555-444-3333 | 709-123-4567 | MORE | EDIT |
| | MARY LAMB | 709-133-2977 | 555-222-7777 | 709-890-1234 | MORE | EDIT |
| | BAT MAN | 555-666-0000 | 646-111-0000 | 646-555-6789 | MORE | EDIT |

FIG. 6

| FIRST NAME | MIDDLE NAME | LAST NAME |
|---|---|---|
| BOB | | |

| | | | | |
|---|---|---|---|---|
| COMPANY NAME | ABC CORPORATION | ADDRESS | | |
| DEPARTMENT | SALES | CITY | | |
| TITLE | MANAGER | STATE | | |

| | | | |
|---|---|---|---|
| HOME | 709 166 5555 | PRIVATE | ☒ — 607 |
| MOBILE | 709 123 4567 | PRIVATE | ☐ |
| BUSINESS | 555 444 3333 | PRIVATE | ☐ |
| FACSIMILE | | PRIVATE | ☐ |
| EMAIL | | PRIVATE | ☐ |
| PAGER | | PRIVATE | ☐ |

SAVE    CANCEL

*FIG. 7*
| | NAME | HOME | BUSINESS | MOBILE | |
|---|---|---|---|---|---|
| 712 → | BOB | PRIVATE | 555-444-3333 | 709-123-4567 | MORE |
| | MARY LAMB | 709-133-2977 | 555-222-7777 | 709-890-1234 | MORE |
| | BAT MAN | 555-666-0000 | 646-111-0000 | 646-555-6789 | MORE |
| | ⋮ | ⋮ | ⋮ | ⋮ | |
*FIG. 8*
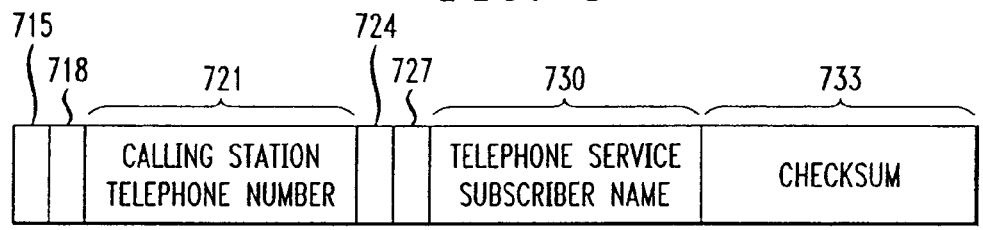
*FIG. 9*
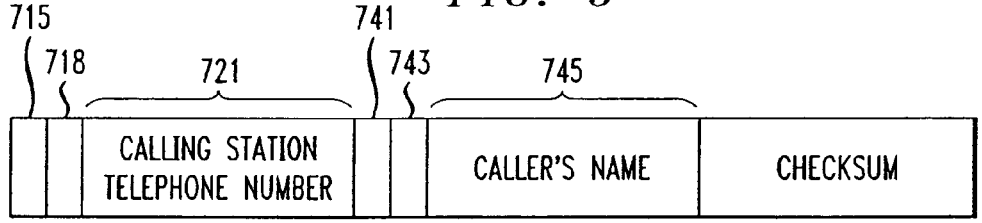
*FIG. 10*
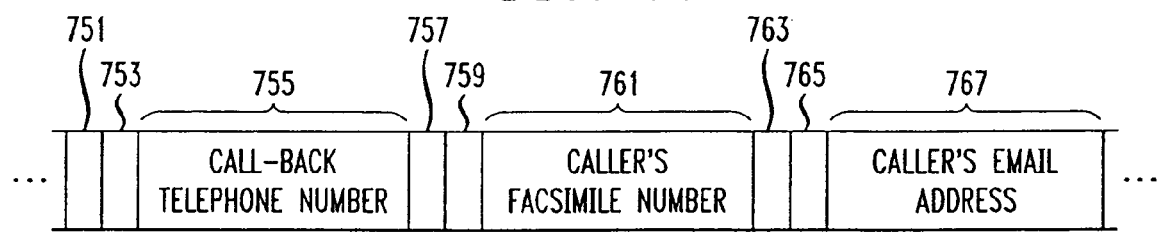

FIG. 18

| | | | | | | | |
|---|---|---|---|---|---|---|---|
| <-- Hide panel | | Current Time Zone: | | PST: (GMT -8:00) Pacific Time ▼ | | | |
| ◁ Friday February 2, 2001 ▷ | | (Default Time Zone:) | | EST: (GMT -5:00) Eastern Time ▼ | | | |
| Show Appointments in: [Show] | | | | | | | |
| ☐ This folder only | | ☑ All Appointments | | ☐ My Appointments | | ☐ Corporate Schedule | |
| My Appointments Add Appointments | | | | | | | |
| | Sun | Mon | Tue | Wed | Thu | Fri | Sat |
| week 5 | 28  Add | 29  Add | 30  Add | 31  Add | 1  Add | 2  Add<br>1p<br>MetroDex<br>design<br>me....<br>4p Staff<br>Meeting | 3  Add |
| week 6 | 4  Add | 5  Add | 6  Add | 7  Add | 8  Add | 9  Add | 10  Add |
| week 7 | 11  Add | 12  Add | 13  Add | 14  Add | 15  Add | 16  Add | 17  Add |
| week 8 | 18  Add | 19  Add | 20  Add | 21  Add | 22  Add | 23  Add | 24  Add |
| week 9 | 25  Add | 26  Add | 27  Add | 28  Add | 1  Add | 2  Add | 3  Add |

FIG. 19

New Appointment

Title

Location

Date
February ▼ 2 ▼ 2001 ▼             Adding to [My Appointments ▼] folder

Time
○ All day event                   Time Zone:
● Start Time: 1pm ▼ :00 ▼ End Time: 2pm ▼ :00 ▼    PST: (GMT -8:00) Pacific Time ▼
                                  1405 ─── ● Private  ○ Show as Busy   ○ Public
                                                        1407          1409
                                  Notes Repeating
● Do not repeat this event
○ Repeat   Every ▼   Day ▼
○ Repeat on the  First ▼   Sun ▼   of the month every  month ▼
           ● Always
           ○ Until  February ▼ 9 ▼ 2001 ▼

Reminders
○ Do not send a reminder
○ Send a reminder  --- ▼  before the event via:
  Email: 5036439400@attmessaging.com

[Save]  [Save & Add]  [Cancel]

FIG. 23

```
<Profile>
    ⋮

<PersonalInfo>
                    <firstName>John<firstName>
                    <middleName>J</middleName>
                    <laseName>Doe</lastName>
            </PersonalInfo>
    ⋮

<DeliveryMethod>
                    <methodName>fax</methodName>
                    <address>1234567890</address>
                    <ContentInfo>
                            <contentName>number</contentName>
                            <selected>true</selected>
                    </ContentInfo>
                    <ContentInfo>
                            <contentName>name</contentName>
                            <selected>true</selected>
                    </ContentInfo>
                    <ContentInfo>
                            <contentName>details</contentName>
                            <selected>true</selected>
                    </ContentInfo>
            </DeliveryMethod>
            <DeliveryMethod>
                    <methodName>email</methodName>
                    <address>johndoe@home.com<address/>
                    <ContentInfo>
                            <contentName>number</contentName>
                            <selected>true</selected>
                    </ContentInfo>
                    <ContentInfo>
                            <contentName>name</contentName>
                            <selected>true</selected>
                    </ContentInfo>
                    <ContentInfo>
                            <contentName>details</contentName>
                            <selected>true</selected>
                    </ContentInfo>
            </DeliveryMethod>
    ⋮
<Profile>
```

TECHNIQUE FOR PROVIDING PERSONALIZED INFORMATION AND COMMUNICATIONS SERVICES

The present application is a division of application Ser. No. 09/865,230 filed on May 25, 2001, which claims the benefit of U.S. Provisional Application No. 60/257,913 filed on Dec. 21, 2000 under 35 U.S.C. 119(e) and which is a continuation-in-part of application Ser. No. 09/441,656 filed on Nov. 12, 1999 now U.S. Pat. No. 6,870,921

FIELD OF THE INVENTION

The invention relates to a communication system and method, and more particularly to a system and method for providing personalized information assistance and services.

BACKGROUND OF THE INVENTION

In this information age, people need to be well informed and organized to effectively carry out day-to-day activities, especially when they are traveling and away from their "home" site where they normally conduct their business. As a result, use of mobile devices which facilitate mobile communications such as personal digital assistants (PDAs), and wireless phones and devices is ubiquitous. For example, PDAs of the PALM type allow users to store and organize their appointments, to-do lists and contacts information. Some PDAs also allow the users to access the Internet to upload and download information, and communicate with other people and information sources via email.

Similarly, wireless phones conveniently allow users while traveling to call and communicate with other people. In case the users cannot remember the telephone number of a contact or it is not handy, or the users want to obtain directions and other information concerning, e.g., restaurants, theaters, etc., they can call operators for assistance. To that end, an expansive network of communication call centers has been established which provides users with nationwide assistance. However, for those users who would normally be able to call upon personal aides at their offices, the operators may not be as efficient or personal in providing information assistance and services as their personal aides. For example, by using conventional personal information management (PIM) software, a user's personal aide may maintain for the user a directory containing his/her contacts information. Based on some description of the contact provided by the user, especially when the contact is frequently referred to at work, the personal aide oftentimes manages to locate the requested information concerning the contact in the user directory. Thus, requests such as "I need to reach Bob . . . I forget his last name;" "Connect me to Bob at ABC Corporation . . . I need his direct line;" and "I want to talk to the sales manager at ABC Corporation . . . What is his name?" would be sufficient for the personal aide to locate the contact information. On the other hand, an operator typically needs to know at least the complete name of the desired contact and sometimes his/her geographic location before the operator can search a public directory for the contact information. In addition, when the user requests the contact's telephone number, an operator normally provides the desired number verbally while the user may prefer to receive it via email or other electronic automated means for storage and later reference. In that case, most likely either the operator cannot meet such a user preference or its accommodation would incur a significant delay. For example, in accommodating the user preference, the operator needs to, among others, learn the user's email address for the first time. On the other hand, knowing his/her preference and email address, the user's personal aide would automatically send the requested telephone number to him/her via email without delay.

Existing PIM software and devices are often used to store private directory information and personal data, e.g., appointments, to-do lists, etc., but are often not convenient or safe tools for providing directory information to telephone users. Corporate employees in many cases must manually synchronize their personal and their corporate directories, and such private directories are often out of date or otherwise inaccurate, consuming what might otherwise be more productive time.

Accordingly, there is a need for efficient and personalized information assistance for telephone and mobile device users comparable to that which is offered by the users' personal aides or which the users would experience in the home site.

SUMMARY OF THE INVENTION

In accordance with the invention, a server is employed to effectively manage sources of information pertaining to and about a user, including his/her preferences. Such information sources may be in the form of folders containing contacts, appointments, to-do lists, notes, email, events, products and other information which may be tailored to the needs of an individual, or a group, e.g., a corporation, an organization, or a collection of people having a common interest. After identifying a user to the server, the server presents, among others, a list of the contacts folders and appointments folders associated with the user, and at least one option to perform an action on the folders, depending on the user's access rights to the folders. For example, if a folder is created by the user, the user, as the owner of the folder, has rights to view, edit and even delete the folder. The owner can also appoint additional subscribers to the folder, e.g., read-only subscribers and administrators, and can also remove them later. A read-only subscriber can view or read the folder entries, but cannot make changes thereto. An administrator has, in addition to the viewing rights, rights to modify the folder, but no right to delete the folder. An administrator can also appoint or remove read-only subscribers, but not administrators, to or from the folder.

In an illustrative embodiment, the user may access the folders directly through a web interface or indirectly through an operator. The operator acts as an agent of the user and may possess substantially the same access rights to the folders as the user. With access to the user's folders, the operator can be relied upon to efficiently retrieve the desired contact and appointment information, and to modify the information if the user has authority to do so. As a result, such user requests as "I need to reach Bob . . . I forget his last name;" "Connect me to Bob at ABC Corporation . . . I need his direct line;" and "I want to talk to the sales manager at ABC Corporation . . . What is his name?" would be sufficient for the operator to locate the contact information. However, when given more specific data about the desired contact, e.g., his/her full name, the operator may also search a national directory for the desired contact to supplement and/or confirm the located contact information. The operator can further connect the user to the phone number of the desired contact in an expeditious manner. Thus, the operator becomes, de facto, a personal aide to the user. However, advantageously, unlike a personal aide who works a limited number of hours on weekdays, an operator can be reached all the time.

In accordance with an aspect of the invention, the contacts and appointments folders may be readily updated by synchronization with data sources in a PIM application. To that end, the user may specify an association of each folder with the PIM data source with which the folder is to be synchronized. In addition, the user may specify the frequency of synchronizations, and the direction(s) of information flow between the folder and the associated PIM data source. For example, the user may specify that any changes to the folder are to be reflected in the associated PIM data source, and/or the other way around.

In accordance with another aspect of the invention, after a user locates information concerning a desired contact in one or more directories, e.g., a contacts folder, which includes the contact's telephone number, the number is then verified and an icon or a link is generated on the directory which is selectable via a web interface to initiate a communication connection to the number. For example, the communication connection may be a voice over Internet protocol (VoIP) connection. In an alternative embodiment, when the icon is selected, a switching system is triggered to establish a first communication connection to the contact's telephone number, requesting the contact to hold for the user. The switching system then establishes a second communication connection to the user's telephone number, and bridges the first connection to the second connection to allow the user to communicate with the contact.

In accordance with yet another aspect of the invention, when a service concerning a future event is provided for the user, e.g., making a restaurant reservation for the user, an appointment record containing information concerning the future event is generated and incorporated in one or more of the user's appointments folders. In addition, the user is reminded of the future event by transmitting to the user a notification containing at least part of the information in the appointment record prior to the future event. Moreover, similar notifications may be transmitted to the invitees of the event as invitations.

In accordance with still another aspect of the invention, at least one profile associated with a user or group of users, e.g., a wireless telephone user, is employed to provide a service, e.g., information assistance, to the user. The profile was previously established, and is identified by an identifier, e.g., an automatic number identification (ANI), which is associated with a communication, e.g., a telephone communication, requesting the service. The profile includes preferences which define options of the service. For instance, in providing information assistance, one of the preferences may specify use of a special skilled operator, e.g., a foreign language speaking operator, to handle the information assistance call. Other preferences may specify methods of delivery of different listing information which include, e.g., email, facsimile, short message service (SMS) transmissions or other delivery methods. In addition, the user may specify in a profile his/her preferred types of events, areas of interest, food, products, services, manufacturers, merchants and other personal preferences, e.g., preferred music, fashion, sports events, restaurants, seating on a plane, sizes of jackets, etc. Such a profile may be used by a server to tailor the content of information delivered automatically to the user as soon as the information becomes available. For example, based on one such profile, the server, without being prompted by the user, communicates from time to time to the user any sales and advertisement information concerning his/her favorable products, services, manufacturers and merchants; and news and information concerning his/her preferred types of events and areas of interest. Of course, such information may also be obtained upon user's request.

It should be noted that the preferences in a profile may vary with time, and may be adjustable depending on different conditions. For example, preferences applicable to the day time may be turned off in the evening, at which time another set of preferences may control. Similarly, preferences applicable to weekdays may be turned off on weekends in favor of a second set of preferences selected for weekends. Advantageously, by using the profile, the user is automatically provided with a personalized service, without the need of otherwise repeating the preferences, e.g., each time when calling an operator to obtain information and assistance.

BRIEF DESCRIPTION OF THE DRAWINGS

Further objects, features and advantages of the invention will become apparent from the following detailed description taken in conjunction with the accompanying drawing showing an illustrative embodiment of the invention, in which:

FIG. 5 illustrates an Edit GUI in accordance with the invention;

FIG. 6 illustrates a GUI containing contact information in accordance with the invention;

FIG. 7 illustrates a View GUT in accordance with the invention;

FIG. 8 illustrates a first example of caller identification (CID) data to be transmitted to a called station in accordance with the invention;

FIG. 9 illustrates a second example of CID data to be transmitted to a called station in accordance with the invention;

FIG. 10 illustrates a third example of CID data to be transmitted to a called station in accordance with the invention;

FIG. 18 illustrates a MONTHLY VIEW page of an appointments folder in accordance with the invention;

FIG. 19 illustrates an ADD APPOINTMENT VIEW page for adding an appointment record to an appointments folder in accordance with the invention;

FIG. 23 illustrates another user profile in extensible markup language (XML) which is equivalent to that of FIG. 22.

DETAILED DESCRIPTION

The invention is directed to providing personalized information and communications services to users, e.g., telephone and mobile device users, especially when they are away from their "home" site from where they normally conduct their business. An objective of the invention is to provide the users with the personalized services comparable to those which are offered by the users' personal aides, or which the users would experience in their home site. The invention is realized by providing the users with information management tools which include private directory, direct connect, calendaring and user profile functions described below. In accordance with the invention, such management tools can be flexibly defined by the users to effectively handle dynamic information. The latter may include, e.g., sales and price data which varies with time, and user profile preferences adjustable depending on different conditions, e.g., weekdays vs. weekends, daytime vs. evening, travel in business class vs. first class when one of the classes is full, and whether the user is in a roaming calling area. In accordance with an aspect of the invention, an expansive network of information/call centers are used where operators can effectively provide the users with the personalized information and communications services. Such services may include, e.g., providing directory information, movie listings, restaurant recommendations, directions to various places, etc.; making reservations; sending invitations; administering appointments calendars; ticketing and conducting other transactions for the users. It should be pointed out that the term "operator" here broadly encompasses entities that are capable of providing assistance in a telecommunication environment, including without limitation human operators, voice response/recognition capabilities, web-enabled operator services, and other automated and electronic access.

Figure 1:
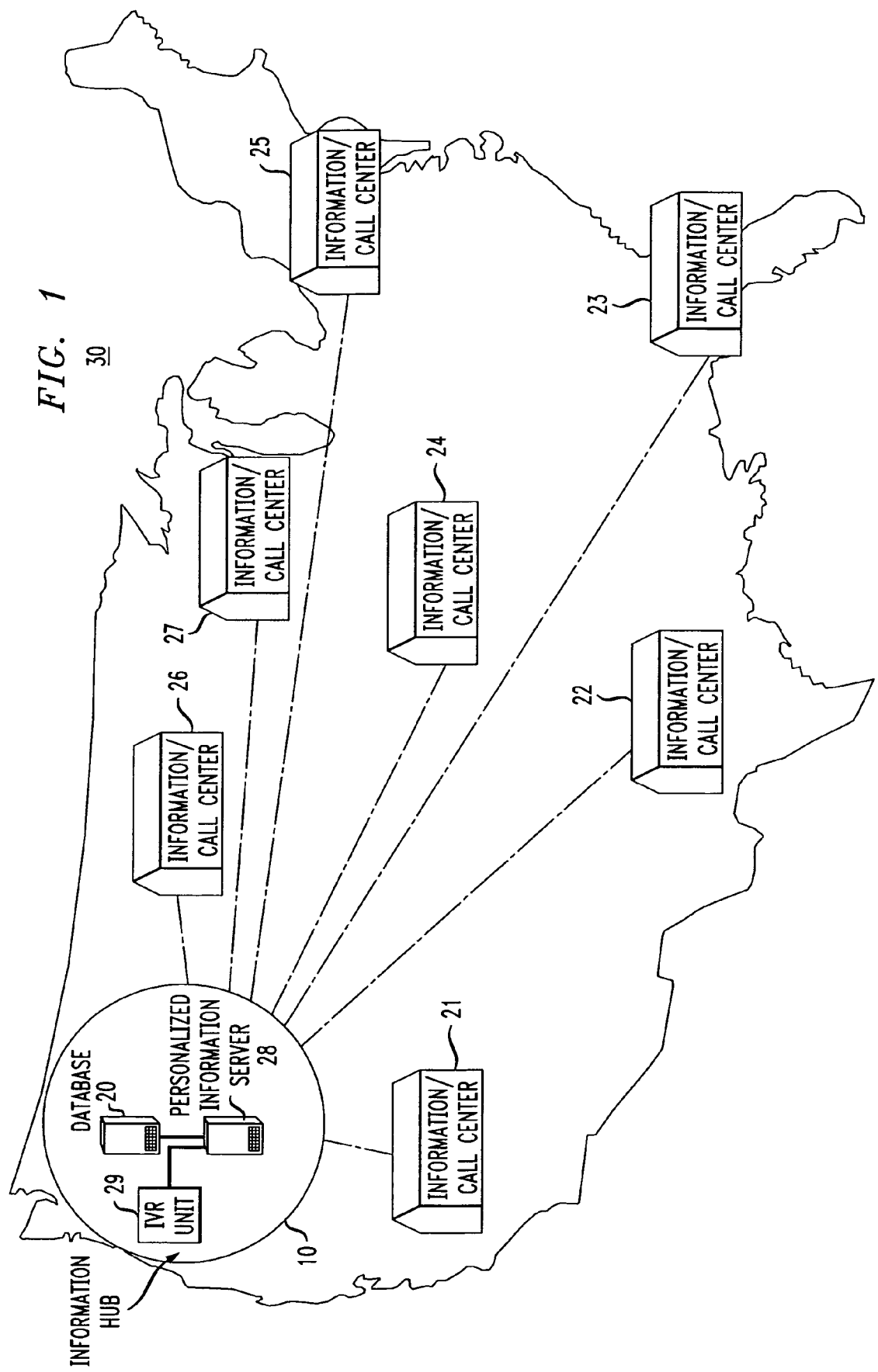
FIG. 1 illustrates a communications system including information/call centers in accordance with the invention.

FIG. 1 illustrates a system embodying the principles of the invention, which includes wide area network (WAN) 30 covering an extensive area. WAN 30 can be an Internet-based network such as the World Wide Web or a private intranet based network. In this illustrative embodiment, WAN 30 connects operators dispersed throughout a wide coverage area in information/call centers 21 through 27. Each of information/call centers 21 through 27 covers one or more regional coverage areas. One or more information hubs 10 are also included in WAN 30. An information hub 10 includes one or more personalized information servers 28 which are accessible by the operators in the system and one or more databases 20 in which users' contacts, appointments and other folders and information are stored and maintained. Such folders and information may also be stored locally at one or more of the information/call centers. The folders and information at different centers are synchronized. Synchronized databases provide necessary backup as well as support to roaming mobile device users.

It should be noted at this juncture that although the ensuing discussion illustratively focuses on contacts and appointments folders, it similarly applies to other folders containing, e.g., to-do lists, notes, email, events, products and other information which may be tailored to the needs of an individual, or a group, e.g., a corporation, an organization, or a collection of people having a common interest. Thus, in this illustrative embodiment, the contacts and appointments folders contain contacts and appointments information pertaining to an individual or a group. For instance, an individual may want to create multiple contacts (appointments) folders for different purposes. Such contacts (appointments) folders may include a personal contacts (appointments) folder containing personal contacts (appointments) information, a business contacts (appointments) folder containing business contacts information, and a softball group contacts (appointments) folder containing contacts (appointments) information which pertains to the softball league to which the individual belongs. The creator of a folder by default is the "owner" of the folder, although the ownership of the folder is transferrable. For example, in the event that the individual owner may want to allow his/her spouse to access the personal contacts folder, the owner can grant the spouse the right to view the folder entries only. The spouse would then become a "read-only" user of or subscriber to the folder. Furthermore, the owner may want to allow the spouse to modify the personal contacts folder to add his/her own contacts information thereto. In that case, the spouse would become an "administrator" of the folder.

Thus, in the first instance, the owner of a contacts or appointments folder is the only subscriber and has sole access to the folder. The owner can appoint additional subscribers to the folder, e.g., read-only subscribers and administrators, and can also remove them later. A read-only subscriber can view or read the folder entries, but cannot make changes thereto. An administrator has, in addition to the viewing rights, rights to modify the folder, but no right to delete the folder. An administrator can also appoint or remove read-only subscribers, but not administrators, to or from the folder.

A group, e.g., a company, may take advantage of the invention by keeping the contacts information of all of its employees in a contacts folder. Different levels of access may be set up for different employees. For example, some employees may be provided access to the actual contact details contained in the contacts folder. In contrast, other employees may only have the ability to place calls, without being supplied with the contact details of the party called.

In this illustrative embodiment, a contacts (appointments) folder may be created and maintained (1) through the Internet or other communications means; (2) through an agent, e.g., an operator; and/or (3) using a PIM. In case (3), by running a synchronization engine, any contacts (appointments) information which has been changed (added, edited or deleted) in a PIM data source may be updated in the corresponding contacts (appointments) folder, and vice versa, subject to the access rights of the user.

In case (2), a user may access a contacts (appointments) folder through communications with an operator at an information/call center via telecommunication media, e.g., wireless telephone, wireline telephone, voice over Internet protocol (VoIP), PDA, VPN, etc. The operator, as explained in more detail below, is generally provided with web browsing capabilities, telephone facilities as well as fully-featured operator user interface applications which facilitate the searching, retrieval and administering of database 20 through server 28. It is well understood that operators generally receive and respond to requests for information and communications services.

In accordance with the invention, an operator to whom a user (i.e., a read-only subscriber, administrator, or owner) of a contacts (appointment) folder corresponds is provided at least the same access rights to the folder as the user. Thus, if the operator corresponds to a "read-only" subscriber, the operator may only view the contacts (appointments) folder but not change it. On the other hand, if the operator corresponds to an owner of the folder, the operator has full access rights to the folder. However, an operator has additional access rights. For example, if a user has changed telephone numbers, an operator is allowed to change the association of the user's folders from the old telephone number to the new telephone number. This situation is frequently encountered when users change wireless carriers. The operator may confirm that the carrier to which the user subscribes allows creation of contacts (appointments) folders and, if so, may record certain information concerning the user including a password, a username, and/or an email address to provide the personalized services in accordance with the invention.

Figure 2A:
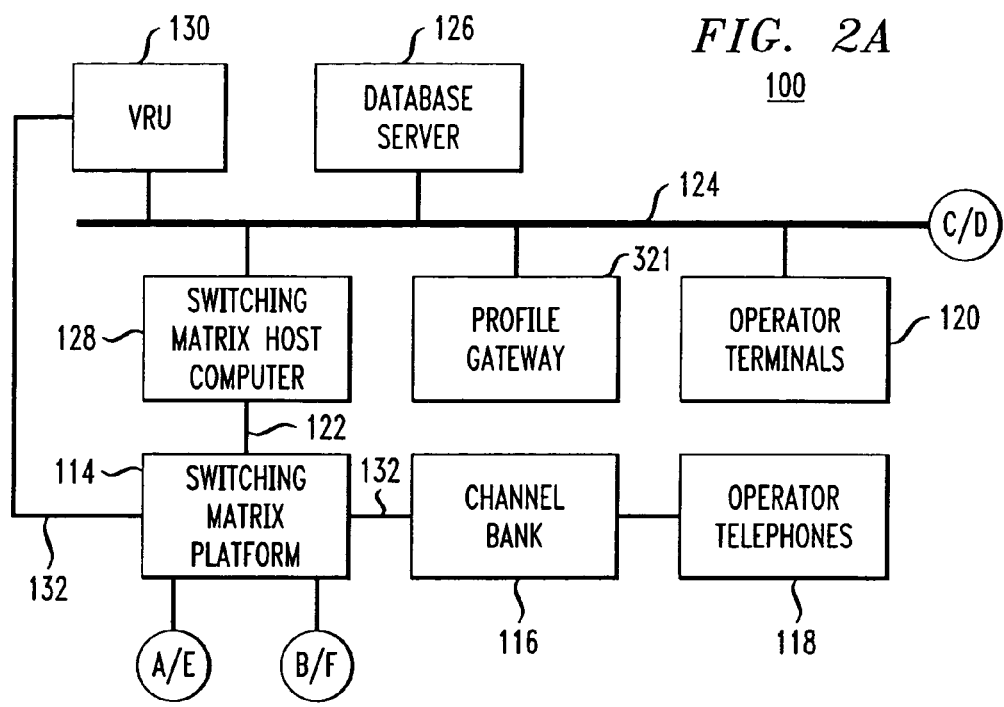
FIGS. 2A and 2B are block diagrams of components of the communications system of FIG. 1.
Figure 2B:
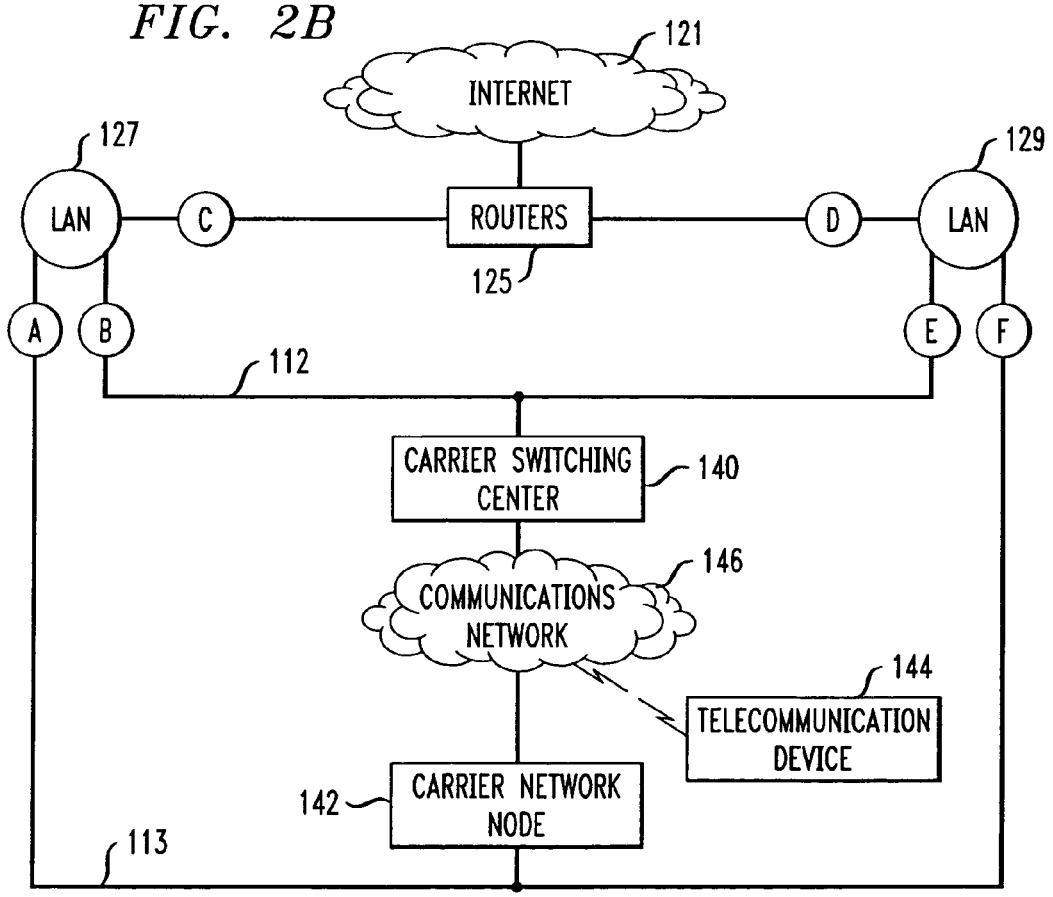

Referring to FIGS. 2A and 2B, information/call center 100 (which generically represents one of aforementioned information/call centers 21 through 27) is attended by operators, which includes switching matrix platform 114 connected to one or more external T1 voice connections 112 and one or more corresponding T1 data connections 113 from carrier networks. Switching matrix platform 114 is also connected via T1 communication links to channel bank 116 for coupling to operator telephones 118.

Each operator is equipped with a terminal 120 that includes a monitor, mouse and keyboard with associated dialing pad. The operator terminals are coupled over data network 124 to database server 126, allowing an operator to access the data in database server 126 through operator terminals 120. Database server 126 contains, among other things, public directory information.

Data network 124 further connects to voice response unit (VRU) 130, profile gateway 321 described below, and switching matrix host computer 128 (also known as a PBX host), which in turn is connected to switching matrix platform 114 by switch data link 122. Data network 124 consists of, but is not limited to, local area network (LAN) 127, best seen in FIG. 2B. LAN 127 may connect to other similar remote LANs 129 to form WAN 30 in FIG. 1. LANs 127 and 129 are connected to one another and to Internet 121 via routers 125.

A user's telephone, computer, PDA or other telecommunication device 144 communicates via communications network 146 which is connected to carrier network node 142 and carrier switching center 140. T1 voice connections 112, or voice links, provide connection between the information/call center's switching matrix platform 114 and the carrier's switching center 140, through which incoming information assistance calls are received. T1 voice connections 112 further provide connection to the carrier network over which outgoing calls are placed (which network may be different than that used for incoming calls). Similarly, T1 data connections 113, or data links, provide a signaling connection between the information/call center's node (not shown) and carrier network node 142, through which incoming and outgoing signaling messages are transported. The information/call center node is contained within switching matrix platform 114, but one with skill in the art will appreciate that the information/call center node could also be a physically distinct component. If the outgoing call is being placed over a different network than that on which the incoming call was received, a second data connection to the outgoing network will be established.

Switching matrix platform 114 is conventional which includes digital signal processing circuitry providing the requisite conference capability, and DTMF and multi frequency (MF) tone generation/detection capabilities. In this illustrative embodiment, switch 114 supports digital T1 connectivity. The operation of switching matrix platform 114 is governed by computer-readable instructions stored and executed on switch matrix host computer 128.

VRU 130 is employed to play the constantly repeated parts of an operator's speech, namely the various greetings and signoffs (or closings), and the caller's desired telephone number where requested. Not only does this system provide a voice-saving and monotony-relief functionality for the operators, it performs a "branding" function (i.e.,. the pre-recorded messages incorporate the name of the telephone company through which the caller was routed to the information assistance service), and it also reduces the amount of time an operator is actually connected to a caller. VRU 130 may also contain a voice recognition system for receiving verbal input from a party connected to the VRU.

VRU 130 is connected via data network 124 to switching matrix host 128 (to which it acts as a slave processor) and via one or more T1 spans to switching matrix platform 114. Each VRU 130 when more than one is employed in information/call center 100, connects to switching matrix platform 114 via a separate voice server link. VRU 130 comprises a general purpose computer incorporating one or more voice cards, which serve as the interface between VRU 130 and the T1 span to switching matrix platform 114. A voice card in VRU 130 monitors and controls communications over the T1 span. Its capabilities include telephone tone detection and generation, voice recording and playback, and call progress analysis. Similar to switching matrix platform 114, VRU 130 is capable of detecting connection status conditions, detecting caller keypresses, and generating tones.

At appropriate stages in a call progression, switching matrix host 128 initiates a voice path between VRU 130 and switching matrix platform 114 such that the caller, or the caller and the operator, are able to hear whatever pre-recorded speech is played on that circuit by VRU 130. Switching matrix host 128 then instructs VRU 130, via data network 124, what type of message to play, passing data parameters that enable VRU 130 to locate the message appropriate to the call state, the service-providing telephone carrier, and the operator.

Database server 126 enables the operator to search not just by name and address, but also by type of goods/services and/or geographical region, or by any other attribute in the caller record, including phone number.

Users of a particular telephone carrier or company may dial, speak or otherwise communicate the access digits, access codes or retail numbers, or input an address or a URL established for information assistance by that company. The instant example assumes that the user dials the designated access number, e.g., "411", "*555," "555-1212" or "00." The participating telephone company's own switching system will then reroute the call to information/call center 100 (via a T1 channel), where it appears as an incoming call.

Automatic call distribution (ACD) logic is used to queue (if necessary) and distribute calls to operators in the order in which they are received, and such that the call traffic is distributed evenly among the operators. In other embodiments, other distribution logic schemes are utilized, such as skills-based routing or a priority scheme for preferred callers. The queue is maintained by switching matrix host 128.

When a call is connected to an operator, switching matrix host 128 directs VRU 130 (also conferenced into the call) to play a greeting message, using a message prerecorded by the connected operator. Both the operator and the caller hear the message, which incorporates the name of the service or company to which the caller is a subscriber (in other words, the call is "branded"). The message ends with a prompt, thus cuing the caller to volunteer what information they are seeking. When the automated greeting is complete, the VRU is disconnected, and the operator and the caller are left connected by a 2-way speech path. From this point, the caller is interacting with a live operator.

Figure 3:
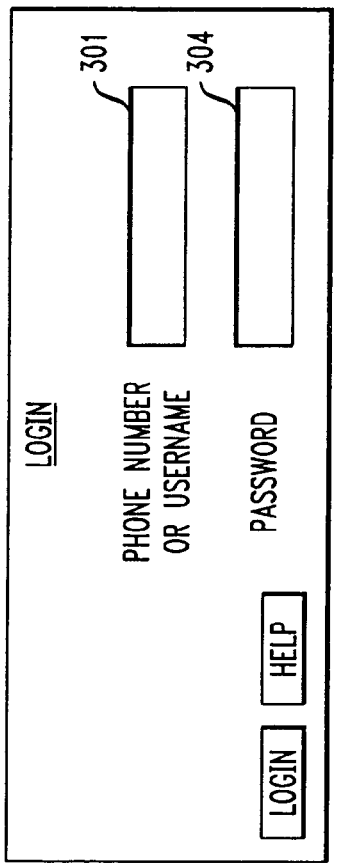
FIG. 3 illustrates a Login graphical user interface (GUI) for providing personalized information and communications services in accordance with the invention.

As mentioned before, a user may create, maintain or access a contacts (appointments) folder via the Internet or other communications means, or through an operator who in turn may create, maintain or access the folder on behalf of the user. Without loss of generality, the user in this instance wants to access a contacts folder through an operator. To that end, the user uses telecommunication device 144, e.g., a wireless phone, to call an operator at a designated access number. Let's say the call is routed to information/call center 100 where an operator attends to the call. After the user communicates to the operator his/her needs, the operator at terminal 120 accesses personalized information server 28 through WAN 30 (or alternatively Internet 121). In response, server 28 presents on terminal 120 a Login graphical user interface (GUI), which is illustrated in FIG. 3. As shown in FIG. 3, the operator is prompted to enter the user's phone number or username to identify the user, and a password to verify that the user is authorized to access the personalized information and communications service in accordance with the invention.

It should be noted at this point that the user identification and password are established beforehand through a registration process. For example, to join the personalized service, the user can call an operator at the designated access number. As part of the registration, the operator enters at a user data web page on server 28 the user identity, username, password, and telephone number of the particular telecommunication device, e.g., wireless phone in this instance, which the user would use to call the service in the future. It is particularly advantageous to use such a phone number (also known as a mobile directory number (MDN) in the case of a wireless phone number) to identify the user since the calling number would be automatically captured at information/call center 100 when the user calls. Specifically, platform 114 in center 100 in a well known manner derives, from the call set-up signals associated with the user's call, the user's phone number from which the call originates, also known as the automatic number identification (ANI).

Thus, referring to FIG. 3, the ANI of the user is automatically provided in entry 301 by platform 114, thereby obviating the need of the operator's eliciting from the user, and entering, the required phone number or username. (In the event that such an ANI is not automatically available, the user may supply, with or without prompting, the necessary identification.) At entry 304, the operator enters the password provided by the user to complete the login process. The login information is then transmitted to server 28, where it checks the aforementioned user data web page to verify the received ANI and password. After they are verified, server 28 identifies from the user data web page all of the contacts folders and appointments folders associated with the received ANI, and the user's access rights thereto. Server 28 then presents to terminal 120 a Home GUI, listing all such contacts and appointments folders.

Figure 4:
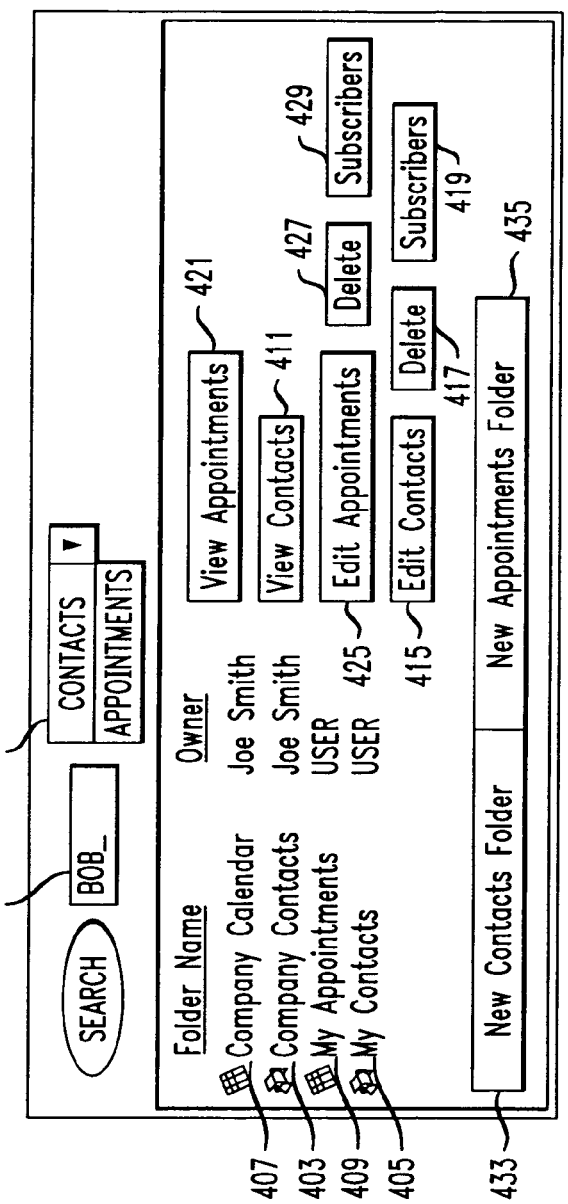
FIG. 4 illustrates a Home GUI in accordance with the invention.

FIG. 4 illustrates such a Home GUI, which lists, among others, contacts folders 403 and 405 designated "Company Contacts" and "My Contacts," respectively. The owners of folders 403 and 405 are identified to be "Joe Smith" and the "User," respectively. After checking the access rights of the user to folders 403 and 405 in the aforementioned user data web page, server 28 determines that the user is a read-only subscriber to folder 403 and an owner of folder 405. As a result, the user is afforded option 411 which is selectable to view information concerning the contacts in folder 403. Since the user is the owner of folder 405, the user is afforded option 415 to edit the contacts information in folder 405. Also by selecting option 415, the user (through the operator acting as an agent of the user in this instance) is able to view the contacts information therein, with or without actually editing it. It should be noted that in this example, it is understood that the user's actions upon folders 403 and 405 are through the agency of the operator. Such an agency relationship should be apparent in the context of the description of the example even though the repetition of this relationship may be omitted from time to time for fear of verbosity. Moreover, the user, as the owner of folder 405, is afforded option 417 to delete folder 405, and option 419 to appoint new administrators and/or read-only subscribers to folder 405, remove their association from the folder, and/or change their access level.

In addition, the Home GUI of FIG. 4 lists appointments folders 407 and 409 designated "Company Calendar" and "My Appointments," respectively. Although the calendaring aspects of the invention are fully described below, it suffices to know for now that depending on the user's access rights to appointments folders 407 and 409, the user likewise is allowed to perform certain actions thereupon. For example, as a read-only subscriber to folder 407, the user is afforded option 421 to view the appointment records therein. As the owner of folder 409, the user is afforded option 425 to edit/view the appointment records therein, option 427 to delete the folder, and option 429 to appoint new administrators and/or read-only subscribers to folder 409, remove their association from the folder, and/or change their access level. The user is also afforded option 433 to create a new contacts folder, and option 435 to create a new appointments folder.

By way of example, instructed by the user, the operator in this instance selects option 415 to edit/view contacts information in folder 405. In response, server 28 presents on terminal 120 an Edit GUI, listing the contacts information in folder 405. This GUI is illustrated in FIG. 5, where for each contact, e.g., Bob, his/her name, home phone number, business phone number and mobile phone number, if any, are displayed, although additional information concerning the contact, e.g., his/her postal and electronic mail addresses, may be available but is not displayed for lack of room. For that reason, a More option, e.g., option 505, is provided for selection to present the additional information on a separate display. In addition, for each contact an Edit option, e.g., option 507, is provided to edit the contact information. For instance, when option 507 is selected, server 28 returns another GUI, which is illustrated in FIG. 6. At this GUI, different fields concerning the contact Bob, e.g., his name, company name, company address, phone numbers, facsimile numbers and pager numbers are presented, and each field may be modified by overwriting any existing information therein.

It should be noted that to protect privacy of certain information about a contact, e.g., his/her home phone number, an owner or administrator of folder 405 is afforded Private options, e.g., option 607, to designate certain contact information private. Accordingly, server 28 exercises censorship on contact information in a folder based on any privacy protection previously imposed by the owner or administrator of the folder. For example, when option 607 is selected, Bob's home phone number is kept private. That is, a read-only subscriber to folder 405 is not privy to Bob's home phone number. As a result, when a read-only subscriber views a listing of the contacts including Bob in folder 405, his home phone number is replaced by a "Private" notice.

However, in accordance with an aspect of the invention, the read-only subscriber may still be connected to Bob's home phone number by the operator, but will not be provided with the number dialed. To that end, after the read-only subscriber calls an operator and requests to be connected to Bob, the operator goes through the similar Login and Home GUIs which however pertain to the read-only subscriber. By utilizing the search engine described below, the operator uncovers listing 712 in a View GUI illustrated in FIG. 7.

It should be noted that this View GUT which is made available to a read-only subscriber (represented by the operator in this instance) to folder 405 is similar to the Edit GUT of FIG. 5 which is made available to an owner or administrator of the folder. However, the two GUIs differ from each other in that unlike the Edit GUI, the View GUI lacks Edit options since a read-only subscriber to folder 405 does not possess edit rights. In addition, Bob's home number, designated private, is revealed on the Edit GUI to the owner or administrator of folder 405, but not on the View GUI. Thus, in this instance, the operator is faced with the same "Private" notice in lieu of Bob's home phone number on the View GUI as would be the case if the read-only subscriber accesses the View GUI on his/her own. In order to connect the read-only subscriber to Bob's home number, the operator at terminal 120 signals switching matrix platform 114 to place the read-only subscriber's call on hold, and selects the "Private" notice. This selection causes an identification (ID) of the subscriber's connection which is on hold, and a request for Bob's home number in folder 405 to be sent to server 28. In response to such a request, server 28 retrieves Bob's home number in folder 405 from database 20, and transmits another request for connecting the subscriber to the retrieved phone number to switching matrix host computer 128 via WAN 30. This request includes the aforementioned subscriber's connection ID. Under control of computer 128, platform 114 then calls Bob's home phone number to establish a connection thereto. Once the new connection is established, computer 128 causes platform 114 to bridge the subscriber's connection identified by the received ID to the new connection, thereby connecting the subscriber to Bob's home number, without disclosing the number to the subscriber, or the operator for that matter.

In an alternative embodiment, the operator plays an active role before the subscriber's connection is bridged to the connection to Bob's home number. In this embodiment, the operator obtains from the user data web page the subscriber's name as registered. However, the operator may also verify the subscriber's name with the subscriber verbally before putting the subscriber's connection on hold. As soon as platform 114 establishes the connection to Bob's home number, the operator is afforded an option to ask Bob over the newly established connection whether Bob wants to talk to the read-only subscriber. If Bob accepts the call, the operator signals host computer 128 to cause platform 114 to bridge Bob's connection to the subscriber's connection, thereby connecting the subscriber to Bob's home number. Otherwise, if Bob declines to talk to the read-only subscriber, the operator informs the subscriber of the declination and causes platform 114 to terminate (or tear down) both connections with Bob and the subscriber.

In another alternative embodiment, VRU 130 takes the place of the operator in asking Bob whether he wants to answer the subscriber's call. That is, before the subscriber's connection is bridged to Bob's connection, VRU 130 seizes Bob's connection and announces in an automated voice, over the connection, an arrival of the call from the subscriber who is identified by his/her registered name. After learning the identity of the subscriber, Bob is afforded a choice to accept the call by pressing a first predetermined key on his telephone. The resulting DTMF signal causes platform 114 to bridge the subscriber's connection to Bob's connection. Otherwise, Bob may press a second predetermined key to reject the call. The resulting DTMF signal causes (a) VRU 130 to announce to the subscriber, through the subscriber's connection, Bob's declination to answer the call, and (b) platform 114 to terminate both Bob's and the subscriber's connections.

In yet another alternative embodiment, the screening of the subscriber's call is achieved by using an improved caller ID (CID) feature in accordance with the invention. Traditionally, by subscribing to a CID service and utilizing a CID receiver, which may be integrated into a phone, a called party between phone rings may receive display CID information on the receiver which includes the originating telephone number, name associated with that number, date and time of the call. One such receiver for receiving CID information is described, e.g., in U.S. Pat. No. 4,582,956 issued to Doughty on Apr. 15, 1986.

The CID information is transmitted from a switching office connected to the called party's CID receiver using frequency shift keyed (FSK) modem tones. These FSK modem tones are used to transmit the display message in ASCII character code form. The transmission of the display message takes place between the first and second rings of the called station. The CID data format and transmitter are described, e.g., in U.S. Pat. No. 4,551,581 ("the '581 patent") issued to Doughty on Nov. 5, 1985. As described in the '581 patent, the data format of each message to be sent to the called station is preceded by the specification of the type and length of the message. For example, for the first message concerning the originating number, the first character sent is the message type which specifies that the ensuing message is an originating number. The second character represents the length of the message. After the message length character are characters which represent the digits of the originating number. Additional messages follow the same data format (i.e., type character, length character and message content in that order). The formatted messages are followed by a checksum or other error detection character which is used to detect errors which may have been introduced in the transmission.

However, we have recognized a few disadvantages of using the traditional CID service. For example, any name which appears in the CID alongside the originating telephone number identifies the telephone service subscriber to that number, and which is registered by a telephone carrier in a directory database, also known as "white pages." Telephone carriers typically have directory listings of wireline telephone service subscribers but currently lack the listings of wireless telephone service subscribers. As a result, when a caller uses a wireless telephone to call a called station, the CID receiver at the called station typically displays the wireless telephone number, but not the name of the associated telephone service subscriber because of a lack of the white pages information. As such, the traditional CID service is ineffective in screening wireless calls by the callers' name.

Return now to the above example where the caller, who is a read-only subscriber to contacts folder 405, asks an operator to connect him/her to Bob's home number which is indicated "Private" in the folder. Not to be confused with a telephone service subscriber, the folder subscriber in this example will now be referred to simply as the "caller." When the caller calls the operator for connecting him/her to Bob's home number, the ANT associated with the caller's call is communicated to center 100 which, as mentioned before, is derived by platform 114 from the call set-up signals. In accordance with an aspect of the invention, the white pages information associated with such an ANI is provided as CID data to Bob for call screening purposes. To that end, host computer 128 provides the ANI to database server 126 to look up the corresponding white pages information. It should be noted that unlike a typical telephone carrier, call/information center 100 in this instance has access to directory listings of both wireline and wireless telephone service subscribers. Thus, based on the received ANI, server 126 locates the directory listing including the name of the telephone service subscriber associated with the ANI. While the connection with the caller is on hold, and the second connection to Bob's home number is being established, host computer 128 in accordance with the invention communicates, as part of the call set-up procedure, the ANI and associated telephone service subscriber name to the called station (i.e., Bob's telephone) as the CID data. Specifically, such ANI and associated telephone service subscriber name are formatted in the well known CID data format and communicated, pursuant to an agreed-upon protocol, to the aforementioned data transmitter in the switching office connected to the called station.

FIG. 8 illustrates the ANI and associated telephone service subscriber name in the CID data format. As shown in FIG. 8, type character 715 specifies that the ensuing message contains the telephone number of the calling station from which the caller calls the operator. Length character 718 specifies the length of such a telephone number. Message field 721 contains the actual telephone number of the calling station, i.e., the ANI. In addition, type character 724 specifies that the ensuing message contains the telephone service subscriber name associated with the telephone number in field 721 according to the directory listing. Length character 727 specifies the length of such a name. Message field 730 contains the actual telephone service subscriber name. Following field 730 is checksum field 733 for detection of transmission errors.

In a well known manner, the data transmitter in the switching office transmits the CID data between rings of the called station, which is displayed on the called station or other connected device for receiving such CID data. As soon as the connection to the called station is established, host computer 128 causes platform 114 to bridge the new connection to the caller's connection which is on hold. Presumably, Bob reviews the resulting CID display information at the called station before he decides to answer the call or not.

However, we have recognized that in the above example, the caller may not always be the same as the telephone service subscriber to the originating number because the caller may have borrowed another person's telephone to call. As a result, the CID message indicating the name of the telephone service subscriber may be misleading in identifying whom the caller is. Thus, in accordance with a second aspect of the invention, after obtaining the white pages information based on the ANI in the above example, the operator checks the name associated with the ANI in the directory listing against the caller's name as registered on the user data web page. If they do not match, the operator may assume that the caller's name from the user data web page is valid as the associated password of the caller was verified in the earlier login process. However, the operator may also verify the caller's name with the caller on the phone. The operator then enters the actual caller's name on terminal 120, which replaces the telephone service subscriber name in the CID data to be transmitted to the called station. FIG. 9 illustrates the resulting formatted CID data, which differs from that of FIG. 8 in that type character 741 and length character 743 in FIG. 9 correspond to the caller's name, as opposed to the telephone service subscriber name. In addition, message field 745 contains such a caller's name.

We have also recognized that with the caller's name ascertained in the above example, the calling station number in the CID data serves no additional identification purpose. However, it may provide a means for the called party to return the caller's call. For instance, upon reviewing the CID display information, Bob may decide not to answer the call immediately as he is unavailable or currently on another call. Bob may try to contact the caller later using the display calling station number. Nevertheless, by the time when Bob calls, the caller may not be at that number, or the caller may want Bob to return his/her call at a different number or by a different method of communications altogether, e.g., facsimile, email or SMS. Thus, in accordance with a third aspect of the invention, the operator may query the caller on the phone for methods of returning his/her call in case Bob does not answer the call immediately. In this instance, let's say the caller wants Bob to return his/her call using a telephone number different from the current calling number, or via facsimile or email. In that case, the caller provides the operator with his/her desired (1) call-back telephone number, (2) facsimile number and (3) email address. Accordingly, the operator enters on terminal 120 the information concerning the call-return methods, along with the caller's name, to generate the CID data to be transmitted to the called station. The resulting formatted CID data by host computer 128 is illustrated in FIG. 10, which includes additional type character 751 and length character 753 correspond to the call-back telephone number, which is contained in message field 755; type character 757 and length character 759 correspond to the caller's facsimile number, which is contained in message field 761 and may be preceded with "F-" to be distinguished from a telephone number; type character 763 and length character 765 correspond to the caller's email address, which is contained in message field 767. Of course, the time period for which each method of communications is the most convenient to the caller may also be specified in the CID data.

Figure 11:
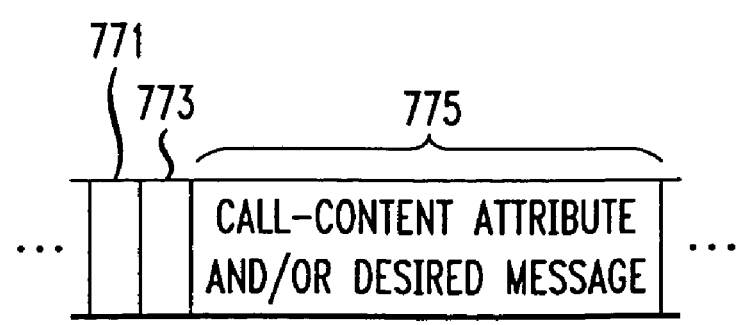
FIG. 11 illustrates a fourth example of CID data to be transmitted to a called station in accordance with the invention.

Further, we have recognized that the caller's name in the CID display may not be sufficient information for the called party to decide to answer the call. The purpose of the call, or the subject of the call may be important as well. For instance, Bob in the above example would answer the call if it concerns a business meeting the next day whereas he would not if it concerns an upcoming social event, even though the caller is the same in each case. Thus, in accordance with a fourth aspect of the invention, the operator, when querying the caller for the call-return methods, may also query the caller for the purpose or subject of the call, or other CID message to be shown to Bob. For example, the caller may want to confirm the meeting with Bob at 10 a.m. tomorrow. In that case, a CID message such as "See you tomorrow at 10" is sufficient to confirm the meeting. In implementation, the CID message may be abbreviated to accommodate the limited number of characters allowed. Thus, upon reviewing such a CID message while the called station is ringing, Bob may choose not to answer the call if he is satisfied with the message, or to pick up the call if he wants to talk to the caller, e.g., to change the meeting schedule or for whatever reasons. Thus, in this illustrative embodiment, the operator also enters on terminal 120 the call-content attribute of the call (e.g., information concerning the call purpose or subject), or any desired message from the caller to generate the CID data to be transmitted to the called station. The resulting formatted CID data is illustrated in FIG. 11, which includes additional type character 771 and length character 773 corresponding to the call-content attribute and/or desired message from the caller, which are contained in message field 775. By reviewing the display CID information at the called station which includes the call-content attribute and/or caller's message in this instance, Bob is able to make a better informed decision whether to answer the call.

Referring back to FIG. 6, as mentioned before, the owner or administrator of a contacts folder is afforded Private options, e.g., option 607 to designate certain contact information (e.g., Bob's home number) private. However, in another embodiment, a selection of one such Private option leads to a query for a desired privacy level. This privacy level is used to qualify the restriction of access to private information. For example, in company contacts folder 403, information accorded privacy level 1 can only be revealed to employees of a company, identifiable by their phone number or username; information accorded privacy level 2 can only be revealed to managers and higher-ranked employees of the company; information accorded privacy level 3 can only be revealed to directors and higher-ranked officials of the company; and so on and so forth. Thus, the invention serves as a clearing house to allow proper parties to access the folder information, i.e., serving only pre-authorized information to a given party.

Referring back to FIG. 4, a search engine is provided on a Home GUI to search for a listing of a desired contact. For example, the operator may specify at entry 455 a search term (e.g., Bob), and select at entry 457 the type of folder (e.g., contacts or appointments) in which the search term is to be found. Thus, by using such a search engine, an informal request without much information, such as "I need to reach Bob" and "I want to talk to the sales manager at ABC Corporation" is sufficient for the operator to locate the requested contact information. After initiating the search by clicking on the "Search" button, any listing satisfying the search query is highlighted. In this instance, a search on the name "Bob" in a contacts folder uncovers listing 512 in the Edit GUI of FIG. 5.

Figure 12:
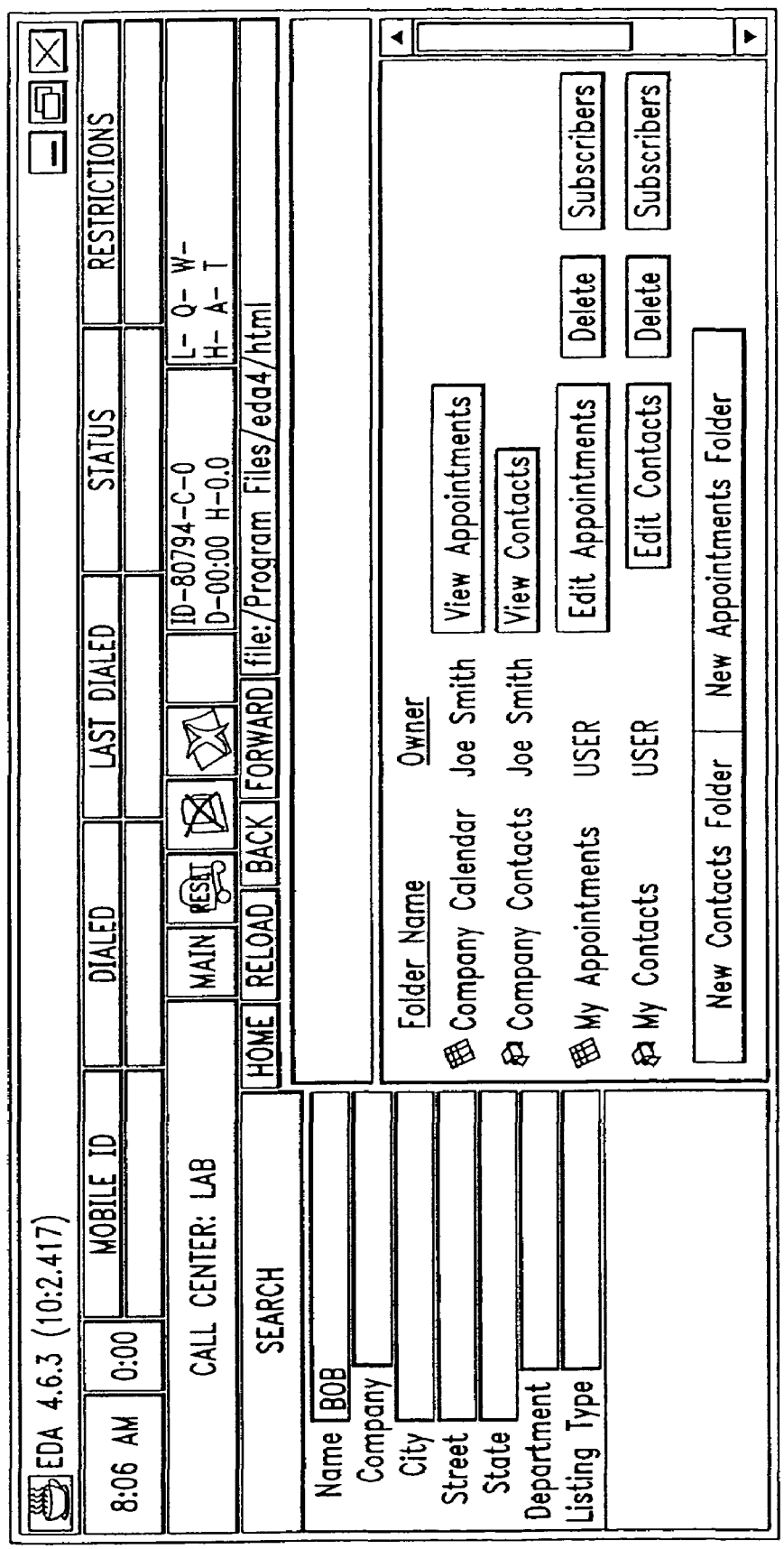
FIG. 12 illustrates a GUI particularly useful for an operator to search for directory information concerning a desired party in accordance with the invention.

It is anticipated that when given more specific data about the desired contact, e.g., Bob's full name, the operator may also search a public directory, e.g., national directory, for the desired contact to supplement and/or confirm the contact information. To that end, GUI 780 in FIG. 12 is designed for the operator to perform such a combined search. As shown in FIG. 12, section 785 of GUI 780 corresponds to the Home GUI of FIG. 4, which allows the operator to manage contacts and appointments folders for the user as described before. In addition, section 782 provides the interface for the operator to search both the contacts folders and public directory for information concerning the desired contact.

Figure 13:
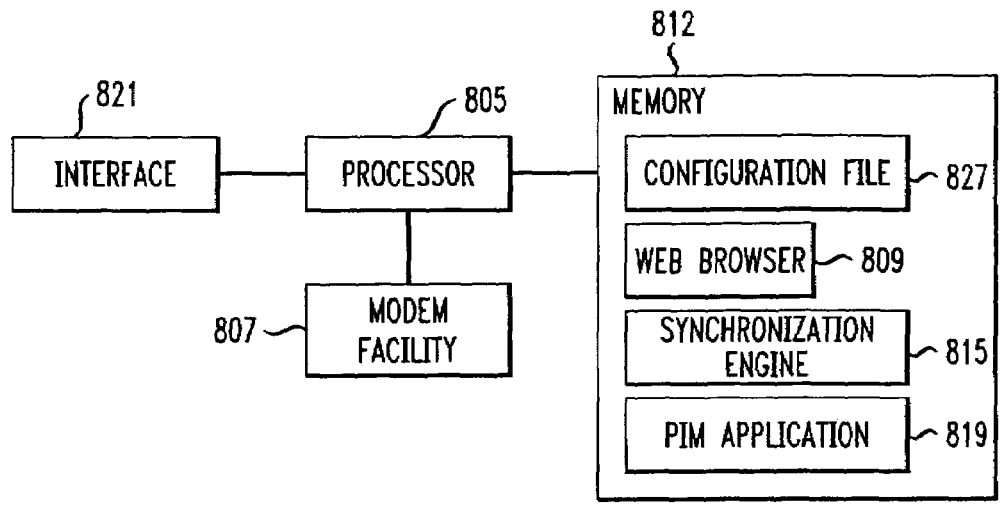
FIG. 13 illustrates a user computer for accessing the personalized information and communications services.

As mentioned before, a user may directly access server 28 to create, manage and/or view contacts folders and appointments folders via the Internet, without agency of an operator. For example, by utilizing computer 803 in FIG. 13, which may be a personal computer (PC) and includes, among others, processor 805, modem facility 807, and memory 812 containing web browser 809, the user can access server 28 over the Internet at a predetermined uniform resource locator (URL). The web pages provided to the user through the direct Internet access are similar to those GUIs described above. For example, upon accessing server 28, computer 803 is presented by server 28 with a Login page similar to the Login GUI in FIG. 3. However, here the user needs to manually enter his/her telephone number or username, or other identifier since he/she cannot take advantage of the ANI feature as in the above-described case where the user calls an operator to access server 28 indirectly. The user is also required to enter the password at the Login page. After the login is verified, server 28 identifies from the aforementioned user data web page all of the contacts folders and appointments folders associated with the user, and the user's access rights thereto. The server 28 then presents to computer 803 a Home page illustrated in FIG. 14. This Home page is similar to the Home GUI of FIG. 4 except that the Home page of FIG. 14 also includes option 905 for synchronization in accordance with the invention.

We have recognized that the user for whatever reasons may utilize conventional PIMs in addition to the inventive personalized services described above to conduct day-to-day activities. These conventional PIMs include, but not limited to, Microsoft Outlook, Outlook Express, Goldmine, Symantec Act!, Lotus Organizer and Lotus Notes applications, or a Palm-type device, which provide capabilities of managing/viewing contacts information and appointments. To effectively conduct the day-to-day activities, it is desirable that the contacts and appointments data sources in one such PIM are synchronized with the contacts and appointments folders in database 20 corresponding thereto so that any changes in the PIM data sources are reflected in the corresponding folders, and vice versa. In this example, one such conventional PIM application, denoted 819, is incorporated in computer 803. Synchronization engine 815, also installed in computer 803, is used to perform the desirable synchronization function. In the event that the user wants to use engine 815 to synchronize with a Palm-type device, one such device may be connected to computer 803 through external interface 821. In this illustrative embodiment, engine 815 is designed based on a commercially available Intellisync Connector SDK kit provided by Puma Technology, San Jose, Calif. Engine 815 may be downloaded from server 28 via the Internet and is configured according to PIM application 819 used. In configuring engine 815, all of the contacts and appointment folders in database 20 associated with the user are identified. However, in accordance with the invention, only those contacts and appointments folders of which the user is either an owner or administrator can be selected to be synchronized with data sources in PIM application 819, stemming from the requirement that a folder can only be modified by its owner or administrator, but not its read-only subscriber. Thus, in this instance, since the user is the owner of My Contacts folder 405 and My Appointments folder 409, the user is afforded options to synchronize folder 405 and/or folder 409 with the corresponding PIM data sources specified by the user.

In addition, in accordance with an aspect of the invention, the user is afforded options to specify the directions and frequency of synchronizations. That is, the user is afforded an option to (a) export any changes in the folders to the corresponding PIM data sources, but not the other way around; (b) export any changes in the PIM data sources to the corresponding folders, but not the other way around; and (c) perform bidirectional synchronization, i.e., both (a) and (b). Information concerning the association of each folder with the PIM data source to be synchronized with the folder, and directions of the synchronization are stored in configuration file 827. After the initial set-up of engine 815 and file 827, each time when the user creates a folder or becomes an administrator of a folder, the user is afforded the above-described options to associate the folder with the corresponding PIM data source and the direction of synchronization.

Figure 14:
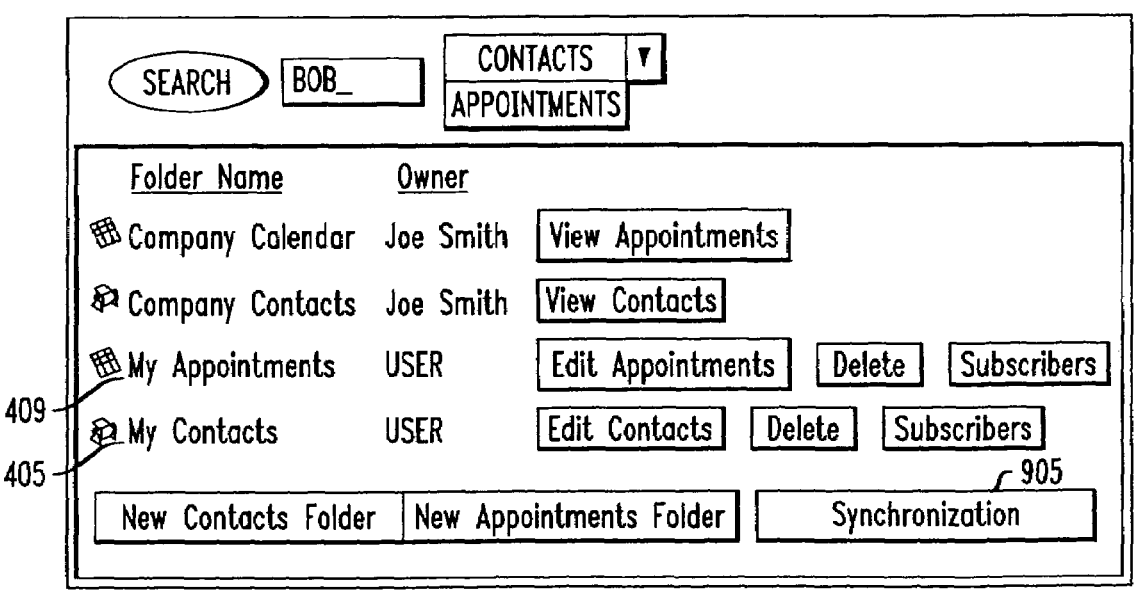
FIG. 14 illustrates a Home page presented on the user computer of FIG. 13.

Referring to the Home page of FIG. 14, Synchronization option 905 in this instance is provided for selection to synchronize My Contacts folder 405 and My Appointments folder 409 of which the user is an owner with the corresponding PIM data sources. It should be noted that the provision of option 905 depends on the association information contained in configuration file 827. In the event that a folder of which the user is an owner or administrator has no association with any PIM data source, a warning about a lack of such association may be issued on the Home page to alert the user. This warning may include highlighting the folder name, e.g., in red. The user may then add any such association to file 827 if he/she so desires.

By selecting option 905, the user initiates the synchronization process where engine 815 causes an exchange of data between each participating folder on server 28 and the associated PIM data source in computer 803 through web browser 809, depending on the direction of synchronization specified in configuration file 827.

Alternatively, the synchronization may be automated by programming engine 815 to synchronize the specified folders with the associated PIM data sources from time to time, provided that computer 803 is connected to server 28. For example, engine 815 may be programmed to perform unattended synchronizations at specified times, after computer 803 has been idle for a specified period, or when the user logs on/off computer 803. In addition, engine 815 may be programmed to suspend any automated synchronization while computer 803 is running on battery power.

Direct Connect Feature

In accordance with a "direct connect" feature of the invention, a user is afforded effective connectivity to phone numbers listed in a stored directory, e.g, My Contacts folder 405 described above, or addresses within a communication network. In a first embodiment realizing the direct connect feature, the user preferably has access to a device, e.g., computer 803, having conventional multimedia capabilities, e.g., speakers, a microphone and a sound card, incorporated therein. Additional telephonic software is also incorporated in computer 803 so that the resulting computer may serve as a phone terminal through which the user may call a telephone number and conduct a phone conversation via a subscribed telephone service. Such telephonic software may be supplied and/or specified by the telephone service provider as part of the service. One such telephone service may be, e.g., the Net2Phone service, which provides telephone connectivity through a communications network implementing a transmission control protocol/Internet protocol (TCP/IP) data transport, e.g., the Internet. The telephone connectivity is realized in a well known manner using voice over IP (VoIP) connections through such a communications network.

Figure 15:
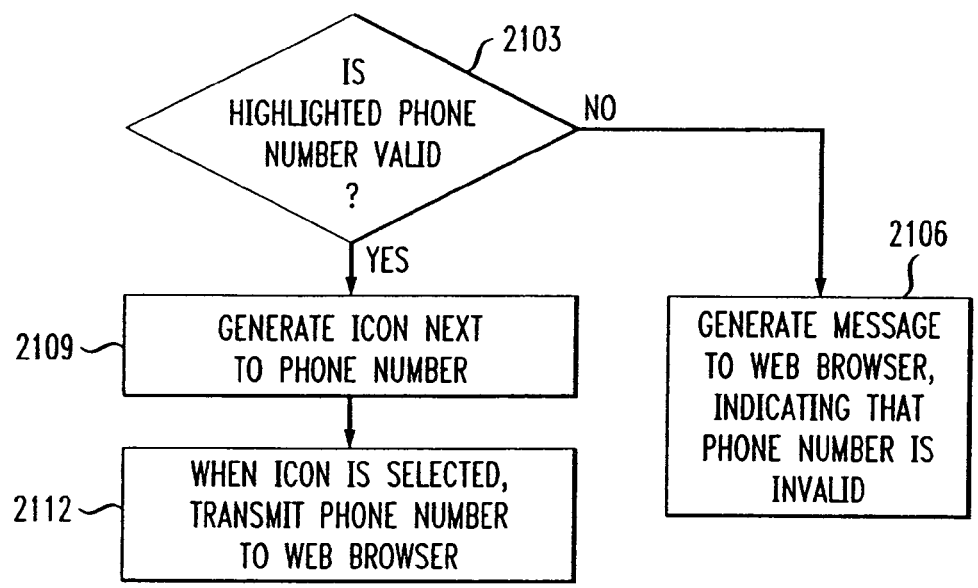
FIG. 15 is a flow chart depicting a first process for realizing a direct connect feature of the invention.

Web browser 809 in computer 803 enables the user to access, through the Internet, a directory database server, e.g., personalized information server 28, connected to the Internet at a predetermined uniform resource locator (URL). For instance, using web browser 809, the user in the manner described before can add to, delete from and update contacts information in folder 405. The user can also search for desired contacts information in contacts folders using the aforementioned search engine in FIG. 4. For example, FIG. 5 illustrates listing 512 containing the desired contact information as a result of one such search. Continuing the example, let's say the user at this point wants to call Bob's home number 1005 in listing 512. To that end, the user uses an indicator device, e.g., a mouse, touchpad, trackball, etc., connected to computer 803 to point and click at the desired number in listing 512 to call. The desired number is then highlighted. In response, server 28 determines whether the highlighted phone number is a valid "dialable" number, as indicated at step 2103 in FIG. 15. In a well known manner, in making such a determination, server 28 checks whether the highlighted phone number consists of only numerals, and is in compliance with the standard telephone numbering plan. If it is determined that the highlighted phone number is invalid, it generates a message to the web browser, indicating to the user that the phone number is invalid, as indicated at step 2106.

Otherwise, if it is determined that the highlighted phone number is valid, server 28 at step 2109 generates an icon or a link, e.g., telephone icon 1007 in FIG. 5, next to the highlighted phone number. When the icon is selected by the user to call the valid phone number, server 28 at step 2112 transmits the phone number to web browser 809 in computer 803. Accordingly, web browser 809 invokes a VoIP application, part of the aforementioned telephonic software, on computer 803, and passes the received phone number to that application. The latter then utilizes the subscribed telephone service to establish a VoIP connection to the phone number over the Internet, whereby the user can conduct the phone conversation at computer 803.

Figure 16:
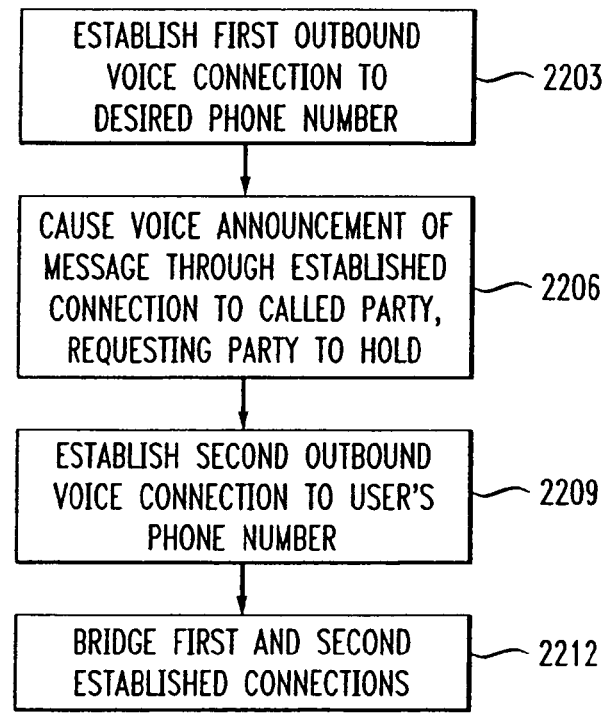
FIG. 16 is a flow chart depicting a second process for realizing a direct connect feature of the invention.

A second embodiment realizing the direct connect feature requires no installation of the telephonic software or telephone service for VoIP connection as in the first embodiment. Rather, this second embodiment relies on an information/call center to establish a callback connection to a desired phone number for the user. For example, let's say the user selects the icon, e.g., telephone icon 1007, next to the desired phone number, e.g., number 1005, on listing 512. Based on the desired phone number, and in particular its area code and/or prefix, server 28 identifies the information/call center which is the closest to the location of the called party at that number. Server 28 then transmits a call initiation message to the identified information/call center via WAN 30, which contains the desired phone number to call, and the user's name and wireless (or wireline, e.g., home) phone number which are prerecorded by server 28 as part of the user registration. The call initiation message is then routed to the identified information/call center, say, information/call center 21, and particularly to the switching matrix host computer therein, i.e., host computer 128 in this instance. Upon receiving the call initiation message, host computer 128 causes switching matrix platform 114 to establish a first one of the outbound voice connections 112 to the desired phone number, as indicated at step 2203 in FIG. 16. Establishment of this call may be restricted by the calling plan and toll restrictions appropriate to the user and the called number. As soon as platform 114 receives answer supervision from the called party, the connected status of the call is fed back to host computer 128. The latter at step 2206 causes a voice announcement of a message through the established connection to the called party, requesting the party to hold for the user. Such an announcement may be accomplished with the help of VRU 130 in the center 100. Host computer 128 at step 2209 causes platform 114 to establish a second one of the outbound voice connections 112 to the user's wireless phone number. When the user answers the call using his/her wireless phone, the connected status of the second connection is fed back to host computer 128. The latter at step 2212 causes platform 114 to bridge (or conference) the first and second established connections to allow the user to converse with the called party.

In an alternative embodiment, after host computer 128 at step 2203 establishes the first connection to the called party and at step 2206 requests the party to hold for the user, host computer 128 may not cause platform 114 to establish the second connection to the user. Rather, host computer 128 reports the connected status of the first connection to server 28. Based on the user's wireless phone number, and in particular its area code and/or prefix, server 28 identifies the information/call center which is the closest to the location of the user at that number, say, information/call center 24. (It will be appreciated that other location techniques, including GPS techniques, may be used, instead, to identify the closest information/call center to the user.) Server 28 then transmits a call initiation message to the identified information/call center via WAN 30, which contains the user's wireless phone number to call. The call initiation message is then routed to information/call center 24 and particularly to the switching matrix host computer therein. Upon receiving the call initiation message, the host computer causes the associated switching matrix platform to establish an outbound voice connection to the user's wireless phone number. Server 28 then bridges the first connection with the called party to the second connection with the user through WAN 30, thereby allowing the user to converse with the called party. It should be noted that the bridge connection portion within WAN 30 extends from the switching matrix host computer of center 21 to that of center 24. These host computers may perform necessary protocol conversions to transport voice information through the bridge connection, pursuant to, e.g., the VoIP.

Calendaring Feature

Figure 17:
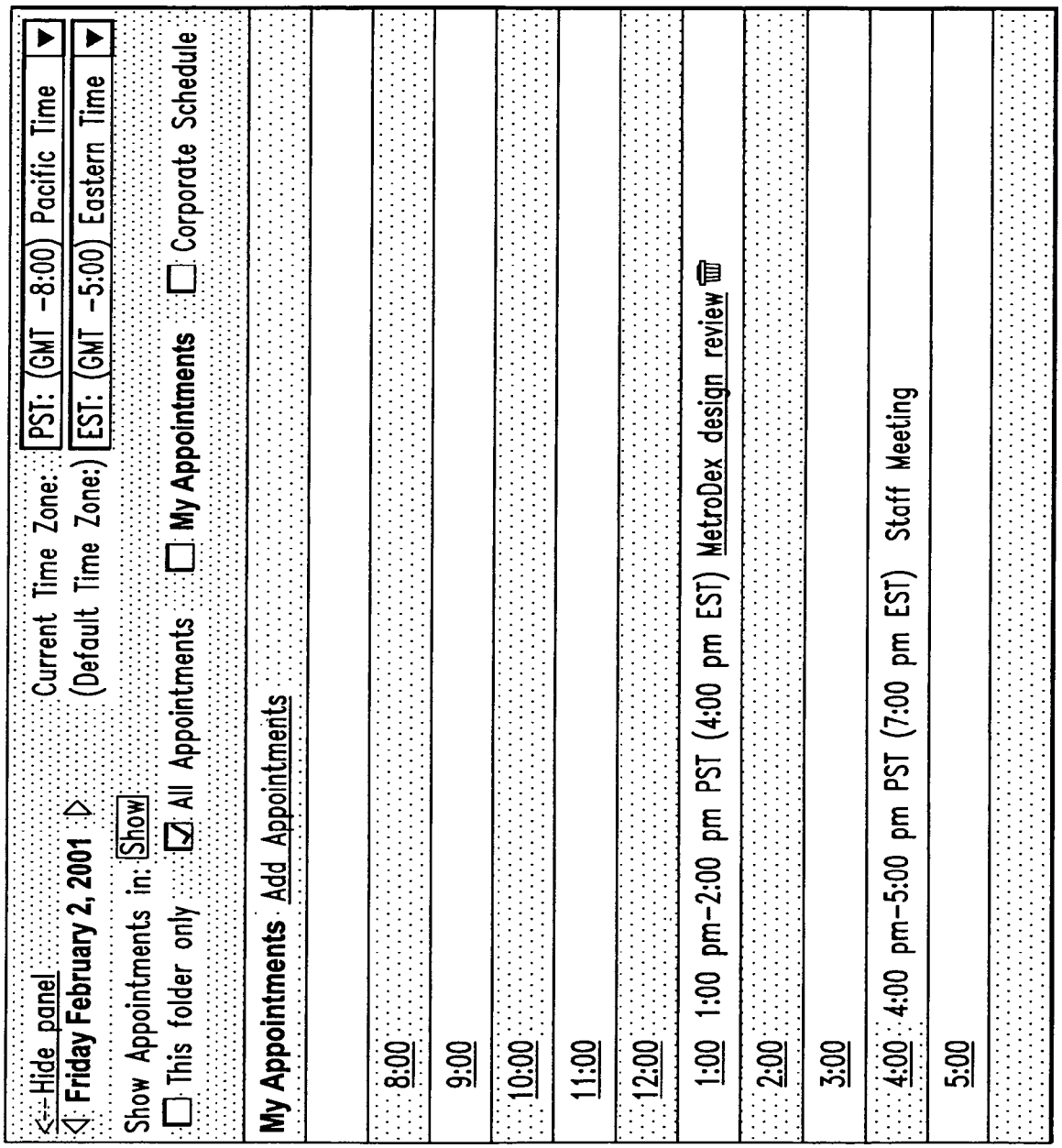
FIG. 17 illustrates a DAILY VIEW page of an appointments folder in accordance with the invention.

In accordance with a calendaring feature of the invention, users may be connected to server 28 to set up one or more appointments folders, e.g., My Appointments folder 409, which are stored in database 20. As described before, database 20 may be accessed via the Internet to which server 28 is connected, and a user may utilize a web browser to navigate through the aforementioned web pages to create, maintain and/or view the appointments folders. In addition, the user may call information assistance and ask an operator to access the appointments folders pursuant to the user's instructions. Alternatively, the user may access database 20 through an Internet connection, a wireless data connection or direct dial-up to server 28, or through a LAN to which the user's computer or communication equipment is connected. FIGS. 17 and 18 illustrate pages of appointments folder 409, respectively. Specifically, FIG. 17 illustrates a DAILY VIEW page showing the user's appointments of a selected date. FIG. 18 illustrates a MONTHLY VIEW page showing the user's appointments of a selected month.

As described before, appointment folders in database 20 can be synchronized with specified data sources in PIM applications and devices. For example, by selecting Synchronization option 905 in FIG. 14, the user can cause the synchronization of folder 409 with the corresponding PIM data source in computer 803.

In addition, the user may call information assistance to learn appointments in appointments folders associated with the user. In response to one such call, an operator may direct the call to interactive voice response (IVR) unit 29 connected to server 28 in FIG. 1 to allow the user to hear selected appointments. In addition, server 28 may be programmed to send a reminder notification to a user prior to his/her appointment. Thus, the notification may be automatic or selected by the user as an option. The notification is provided by server 28 a period before the appointment, where the length of the period may be predetermined or selected by the user, or varies with the subject, category and/or information content of the appointment record provided by the user. For example, if an appointment concerns catching a domestic flight which generally requires a relatively short check-in process, barring any user override, based on an analysis of the subject, category and/or information content of the appointment record, server 28 automatically generates and sends a reminder notification to the user an hour before the scheduled flight. On the other hand, if it concerns catching an international flight which generally requires a relatively long check-in process, the lead period for generating and sending such a reminder notification may be two hours.

In accordance with another aspect of the invention, the reminder notification may be communicated to the user via telephone, SMS, email, facsimile, etc. For example, server 28 may cause IVR unit 29 to call the user's wireless phone number to verbally remind the user of an upcoming appointment. The verbal reminder may be realized by automated voice. In addition, given different methods of delivery of a reminder notification (e.g., via facsimile, SMS, email, wireline telephone, etc.), server 28 may decide to utilize one method of delivery over another depending on the particular situation. For example, when the user's wireless phone is unresponsive as it is outside its home area or wireless phone service coverage, server 28 may instead send the reminder notification via SMS. To that end, database 20 contains the user's SMS and other contact information provided by the user.

A GUI may also be made available for the user to choose, modify or define templates for formatting, e.g., the subject line and/or body of the email message he/she receives as a reminder notification, including adding his/her own static text to the message. Such formatting facilitates automated sorting, forwarding or processing of email based upon patterns found in the subject line and/or body of the message, and helps those email-initiated messaging systems which require specific formatting or content. However, by default, the subject line for the email notification may be taken from the title (or subject line) of an appointment record, which may also include the date and start time of the appointment. The body of email may include the information from a notes field in the appointment record.

As described before, an owner of an appointments folder by default is the only person authorized to view and edit his/her own calendar. However, the owner may also grant other users rights to access the appointments folder. Access rights may have different levels. A user may be granted "read-only" access rights, who is allowed to view certain appointment entries only. For example, the read-only subscriber is generally allowed to view the date, time and title (or subject) of an appointment record, but cannot open the record and view or edit any details thereof. In addition, the read-only subscriber may not even be allowed to view the title of a personal appointment record. Nor can the read-only user add or delete any appointment records. On the other hand, a user granted "administrator" access rights is generally allowed to view, edit, add or delete appointment records, except for a personal appointment record, in which case the administrator-user can only view the appointment date and time of the personal record. In addition, the administrator-user is allowed to grant the read-only access rights to others, or restrict or revoke such access rights.

FIG. 19 illustrates an ADD APPOINTMENT VIEW page for adding a new appointment record to folder 409. The user is afforded options for sharing certain information concerning the new appointment. For example, by selecting private option 1405, the user who is the owner of folder 409 keeps the new appointment record personal. In that case, when a read-only subscriber or administrator accesses folder 409, only date and time information concerning the new appointment is revealed to the subscriber or administrator. In addition, in that case the administrator is not allowed to edit any information concerning the new appointment or delete the new appointment record.

By selecting Show As Busy option 1407, the user keeps the title information of the new appointment record from the read-only subscribers to folder 409. As a result, one such subscriber is allowed to view the date and time information concerning the new appointment, along with a title replaced by the word "busy." On the other hand, an administrator of folder 409 is allowed to exercise his/her full access rights to the new appointment record.

By selecting Public option 1409, the user allows both read-only subscribers to and administrators of folder 409 to exercise their full access rights to the new appointment record. That is, one such subscriber is allowed to view the date, time and actual title of the new appointment, and one such administrator is allowed to view and/or edit every information concerning the new appointment, and even delete the new appointment record.

As described before, a user may call information assistance and asks an operator to access appointments folders in database 20 associated with the user. Upon verification of the user's login information, and determination by server 28 of the user's access rights to each folder, the operator may vicariously administer the folder in response to the user's verbal commands. The operator, as an alter ego of the user, is accorded at least the same access rights as the user. The operator may therefore retrieve, edit, store or delete any details in the folders so long as the user has the authority to do so.

Figure 20:
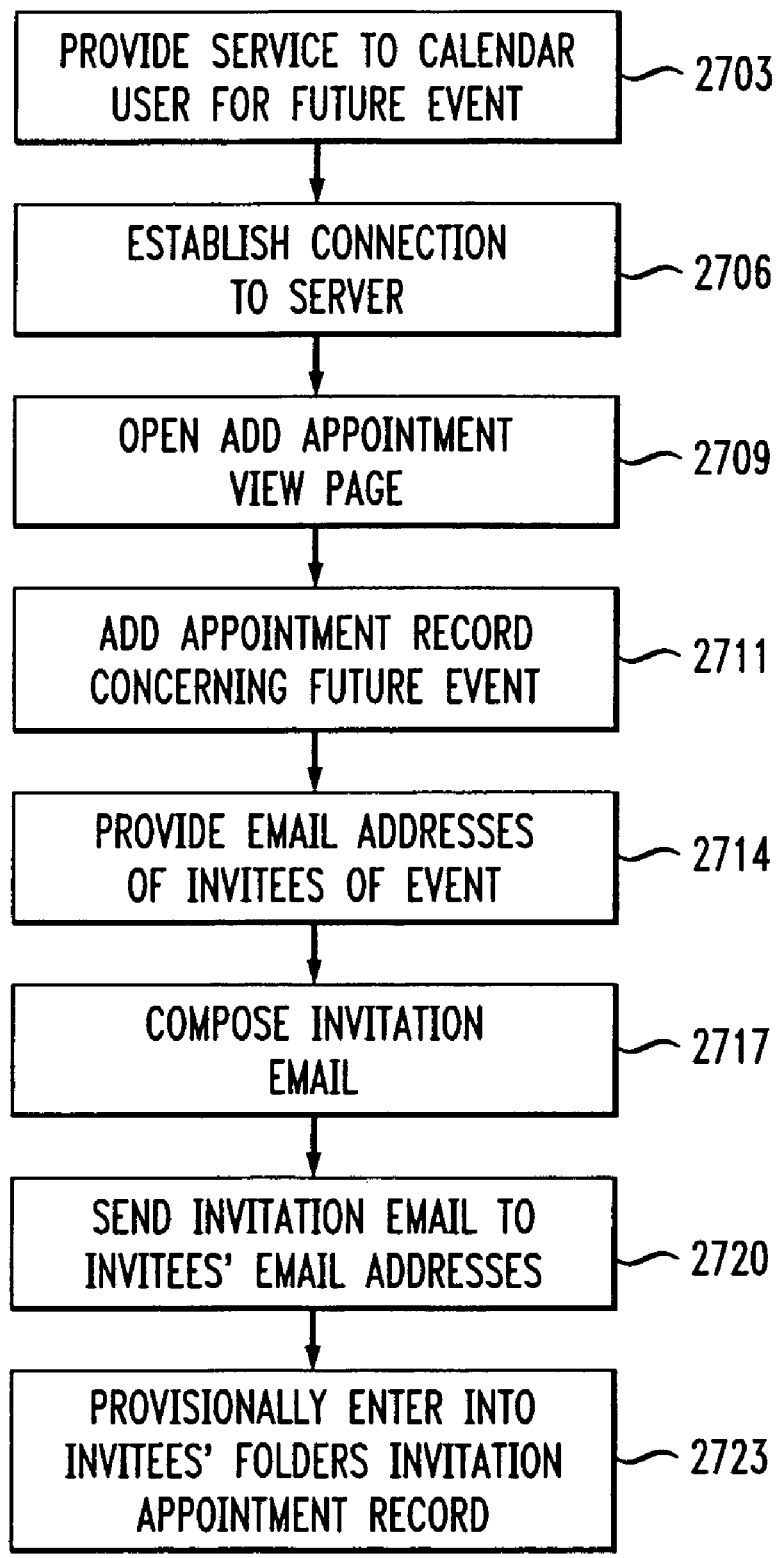
FIG. 20 is a flow chart depicting a process for carrying out certain calendaring functions in accordance with the invention.

In accordance with yet another aspect of the invention, the above-described calendaring feature may be integrated with such other service features as making reservations, ticketing and conducting other electronic transactions for a user. For example, a user can call information assistance for a TeleConcierge® service whereby an operator, at the request of the user, makes restaurant reservations or purchases tickets for sports events, concerts, opera, shows, etc. for the user. It should be noted that the user's preferences, e.g., the preferred restaurant and dining time, may be specified in a user profile, described below, which is made available to the operator when the user calls for the TeleConcierge® service. In addition, the relevant user preferences from the profile automatically populate the fields in an electronic request, e.g., for a restaurant reservation, on operator terminal 120, thereby obviating the need of an interrogation by the operator. Thus, referring to FIG. 20, after an operator at step 2703 provides a service to a calendar user for a future event, e.g., making a restaurant reservation for a party, the operator, at the request of the calendar user, establishes a connection to server 28, opens the ADD APPOINTMENT VIEW page of FIG. 19 of a specified appointments folder, and adds an appointment record concerning the future event to the folder, as indicated at steps 2706, 2709 and 2711, respectively. Of course, the user request can be met only if the user is the owner or administrator of the appointments folder. Continuing the example and assuming that the restaurant reservation is made electronically, e.g., via a TeleConcierge® server (not shown), the reservation information transmitted to the restaurant automatically populates the appropriate fields of the new appointment record, e.g., its title, time, date and notes fields, with minimal manual input by the operator. For instance, the title field of the new appointment record may be pre-populated and read "Reservation at XYZ Restaurant." In addition, the notes field may be pre-populated with information concerning the name under which the reservation was made, restaurant address and phone number, number of people in the party, any smoking preference, etc. The TeleConcierge® server then generates an appointment ID in its own database for identifying the new appointment record. In the event that the reservation is subsequently changed through the TeleConcierge® server, the appointment record identified by the appointment ID is changed accordingly.

The user may also want to inform the invitees of the upcoming event. To that end, the user himself/herself, or through the operator, accesses server 28 which provides the functionality of sending invitations, including the information in the new appointment record, to the invitees via email, facsimile or other methods of delivery. For example, the user in this instance wants to send the invitations via email, the user (or through the operator) provides the email addresses of the invitees of the event to server 28, as indicated at step 2714. Accordingly, server 28 at step 2717 composes an invitation email based on the information of the new appointment record in a manner described before. Server 28 at step 2720 sends the invitation email to the invitees' email addresses just provided. In addition, the user may want to add the reservation appointment to those invitees having their appointments folders stored in database 20. To that end, the user provides such invitees' MDN and other ID information identifying the appropriate folders. Server 28 at step 2723 provisionally enters into the respective invitees' folders an invitation appointment record containing information similar to that of the reservation appointment record described above. The invitees are notified of the provisional invitation appointment the next time when they access their calendars, and it is up to each invitee to adopt the invitation appointment record in his/her folder.

In addition, it should be noted that server 28 is programmed to link (or hyperlink) contact names in the user's appointments folder(s) to the contact information associated with such names in the user's contacts folder(s). Thus, in accordance with still another aspect of the invention, a contact name in an appointment record may be highlighted to indicate that the associated contact information is available in the user's contact folder(s). The user may access such information by pointing and clicking at the highlighted contact name.

User Profile

In accordance with the invention, an operator at an information/call center may utilize one or more profiles associated with a user to effectively provide information and communications services to the user. In general, a user profile is a record containing identifiers and preferences associated with the user. One such profile may be a personal profile including personal preferences selected by the user, which concern particulars of delivery of information and services. The selection of personal preferences may be accomplished through use of Internet web pages or an operator. The resulting personal profile is identified by the user's telephone number, e.g., MDN, and stored in a profile manager described below. Other profiles associated with the user, and the use of any of these profiles in combination with the user's personal profile are fully described below.

By way of example, the user in this instance calls a predetermined information access number for a directory listing, and the information assistance call is routed to, say, information/call center 100 of FIG. 2A. The received information assistance call is then handled by center 100 based on a personal profile previously established by the user. For example, such a personal profile specifies, among others, that the listed name, number and address are to be emailed to the user's email address, e.g., johndoe@home.com, after he/she is connected to the listed number.

Specifically, referring to FIG. 2A, the information assistance call is received by switching matrix platform 114 in information/call center 100. In a well known manner, platform 114 derives, from the signaling associated with the call, the user's phone number from which the call originates, also known as the ANI. The switching matrix host computer 128 then requests any profile identified by such an ANI from profile gateway 321 connected to data network 124.

Figure 21:
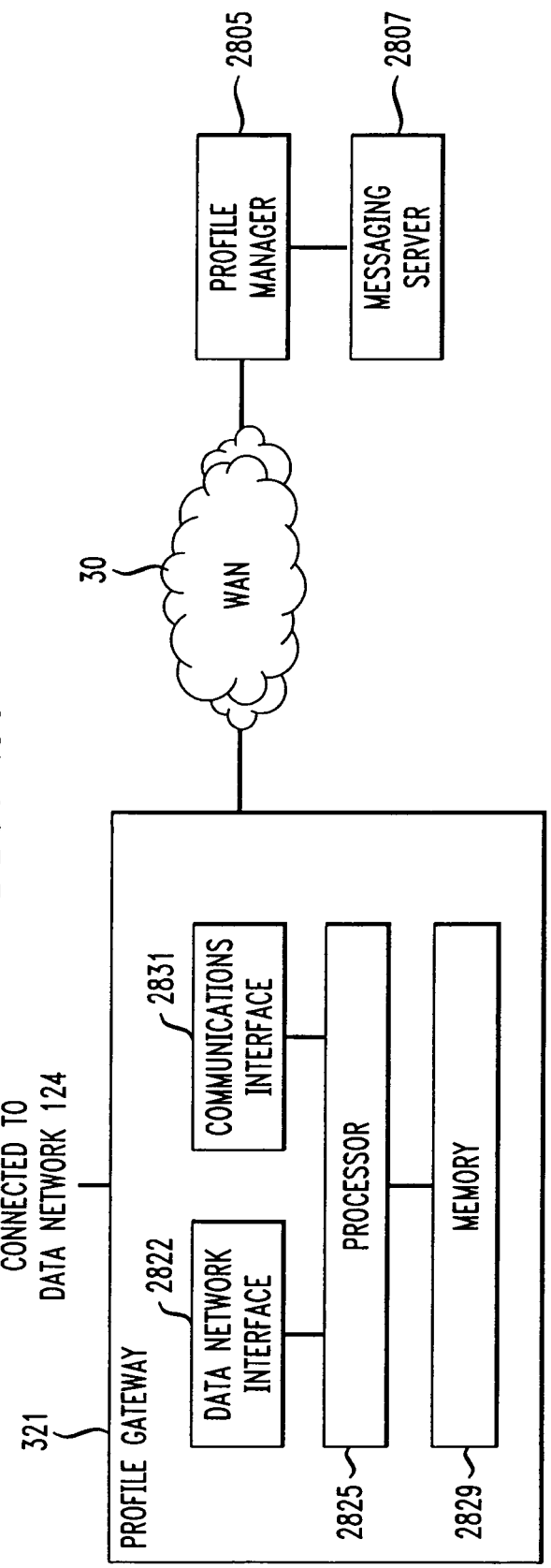
FIG. 21 illustrates an arrangement for providing personalized information and communications services to a user based on the user profile(s)

Referring also to FIG. 21, gateway 321 receives the profile request including the ANI through data network interface 2822. In response to such a request, processor 2825 searches memory 2829 for the profile identified by the AN. It should be noted at this point that all profile data is input and updated (e.g., via Internet web pages or operator) through profile manager 2805, which may be located in information hub 10 in FIG. 1. Copies of the profile data are distributed by manager 2805 to the profile gateways in various information/call centers through WAN 30. In this illustrative embodiment, a master copy of the profiles is kept at manager 2805. For example, profile gateway 321 initially forwards requests for new profiles to manager 2805, and caches copies of the requested profiles from manager 2805 in local memory 2829 for rapid, subsequent retrieval of the profiles. Memory 2829 here generically includes disks, caches, and volatile and nonvolatile memories. When a particular profile in gateway 321 is updated at manager 2805, the latter notifies gateway 321 that the particular profile is expired.

Thus, continuing the above example, if processor 2825 determines that the requested profile cannot be found in memory 2829 or the requested profile is expired, processor 2825 forwards the profile request to manager 2805 through communications interface 2831. In response, manager 2805 provides to gateway 321 any latest profile identified by the ANI. Otherwise, processor 2825 retrieves from memory 2829 any available, unexpired profile identified by the ANI.

In order to expedite the information assistance, host computer 128 preferably is programmed to wait for a return of the user's personal profile for a short predetermined period, e.g., 2 seconds, while the call is placed in queue even if there is an available operator. Nonetheless, host computer 128 may wait for a longer period when no operator is available anyway. Let's assume that the user's personal profile is received by host computer 128 within the wait period. Host computer 128 causes platform 114 to operate according to those parts of the personal profile pertinent thereto. For example, the personal profile may also specify a special skill required of an operator handling the call, e.g., a Spanish language skill. In that case, platform 114 routes the call to, or places it in queue for, a Spanish speaking operator. It should be pointed out at this juncture that the system components of information/call center 100 bear a server-client relationship where gateway 321 serves profile data to clients including host computer 128 and database server 126. When the call is answered by an appropriate operator, which involves another client, namely, database server 126 in this case, host computer 128 forwards a copy of the personal profile to server 126, along with the ANI.

Otherwise, if the personal profile was not received by host computer 128 within the wait period, the host computer forwards to server 126 the ANI without profile data. Accordingly, server 126 issues to profile gateway 321 a profile request similar to that issued by host computer 128, which includes the ANI identifying any user profile. Since by now profile gateway 321 most likely has obtained the necessary user profile data from profile manager 2805 and cached same, gateway 321 efficiently returns a cached copy of the requested profile to server 126.

When the operator answers the call, server 126 communicates to the operator through terminal 120 any profile data pertinent to the handling of the call. The operator then interacts with the user and utilizes server 126 to locate the requested listing. In this instance, the user's personal profile requires that the user be connected to the listing number. It also requires that at the same time the full listing details be sent via email to johndoe@home.com, which is provided in the profile. Thus, as soon as the operator utilizes a well known function of server 126 to connect the user to the listing number, server 126 sends to profile gateway 321 a message, which contains a subscriber identifier identifying the user, the information to be delivered (listing name, number and address in this case) and delivery method (email and email address). Gateway 321 in turn forwards this message to profile manager 2805. The latter then generates an appropriate request to messaging server 2807 for email delivery of the listing name, number and address information, in accordance with the user's personal profile.

Messaging server 2807 may be situated at the same location as profile manager 2805. Server 2807 serves as a gateway for delivering electronic content information to a user, e.g., via facsimile, email, SMS and wireless application protocol (WAP). When it is determined that electronic content information needs to be delivered via one of these communications, profile manager 2805 forwards the necessary content and addressing information (e.g., email address) to messaging server 2807. Messaging server 2807 feeds back to profile manager 2805 information about the delivery status. This information may also be used for billing purposes.

It should be noted that in the above example, profile gateway 321 needs to communicate in real time with profile manager 2805 each time when a requested profile is unavailable or expired in memory 2829. In an alternative embodiment, to avoid such real time communications with manager 2805, thereby saving the response time, a copy of each profile in profile manager 2805 is also stored in the profile gateways in all of the information/call centers, including profile gateway 321. Whenever a change is made to a profile in manager 2805, the latter immediately communicates the change to each profile gateway to ensure that each gateway has the current set of profiles, identical to the master set in manager 2805. Nonetheless, this "copy-all" approach is disadvantageous in that it requires more local memory capacity to store a larger profile database in each gateway.

Figure 22:
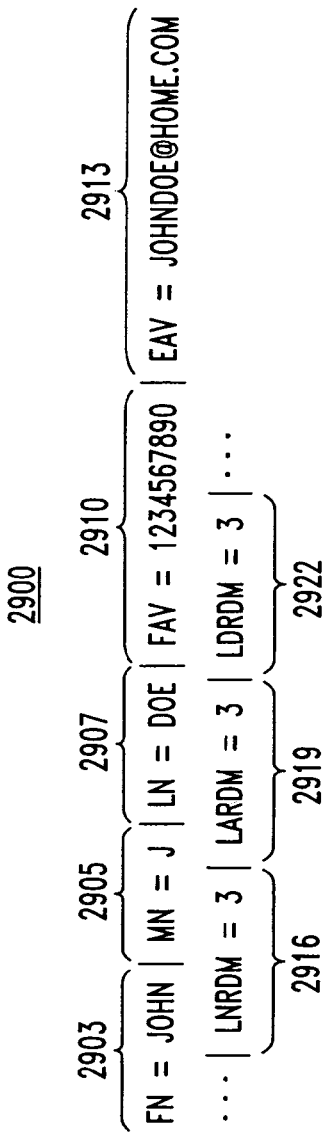
FIG. 22 illustrates a user profile in accordance with the invention.

In general, a profile comprises a string of identifiers, each of which is accompanied by a defined value. FIG. 22 illustrates one such profile, denoted 2900. Profile 2900 serves to provide information about the user and his/her preferences. As shown in FIG. 22, profile 2900 includes FN field 2903 containing the first name of the user, e.g., "John" in this instance; MN field 2905 containing the middle name or initial of the user, e.g., "J" in this instance; LN field 2907 containing the last name of the user, e.g., "Doe" in this instance; FAV field 2910 containing the facsimile number provided by the user, e.g., "1234567890" in this instance; EAV field 2913 containing the email address provided by the user, e.g., "johndoe@home.com;" . . . ; LNRDM field 2916 specifying the user's preferred method of delivery of a listing number, e.g., email which is represented by a value "3" in this instance indicates that email is the preferred method of delivery; LARDM field 2919 specifying the user's preferred method of delivery of a listing address, e.g., email in this instance; LDRDM field 2922 specifying the user's preferred method of delivery of listing details, e.g. email in this instance; and so on and so forth. It should be noted that other content delivery methods other than email, e.g., facsimile, SMS and/or WAP may be specified in fields 2916, 2919 and 2922 of profile 2900. It should also be noted that profile 2900 may be used to specify not only methods of delivery of different parts of listing information, but also whether the multiple delivery methods occur simultaneously. Further, profile 2900 may be used to specify whether, after the content delivery is initiated, the user-caller should be handed off to VRU 130 or the operator to be informed of the delivery status. Although profile 2900 may define the content delivery options, the operator, at the request of the user, may elect other alternative or additional delivery methods, overriding the previously defined option. For that matter, the user may always request the operator to change or temporarily override different defined options in profile 2900, subject to a necessary security check on the user.

In an alternative embodiment, profile 2900 is realized in extensible markup language (XML) which, as is well known, uses tags (words bracketed by "<" and ">") to delimit data. In this instance, profile 2900 expressed in XML is illustrated in FIG. 23, which is equivalent to that of FIG. 22.

Profile 2900 may also define options of various assistance service features which may include, e.g., the above-described TeleConcierge® features whereby the user can make restaurant reservations, purchase tickets, etc.; a NumberBack feature whereby the user is provided with a listing number before he/she is connected to the listing number; and a LocationPro feature whereby the user can obtain directions to a listing address. Similarly, for example, the methods of delivery of (i) a confirmation of a TeleConcierge® reservation or purchase, (ii) a listing number, and (iii) LocationPro directions to the user may be specified in profile 2900 as well.

As mentioned before, the information assistance and services provided to the user may be based on more than one profile associated with the user. These profiles may be arranged in a hierarchy. For example, the hierarchy may consist of seven levels, with the seventh, highest level corresponding to the user's personal profile described above. The sixth level corresponds to a group profile, also known as a "class of service," which includes preferences for a predetermined group of individual users belonging to one or more carriers. The fifth level corresponds to a site carrier profile used when a specific carrier in a specific information/call center is involved. The fourth level corresponds to a call center profile which allows different information/call centers to apply service features in different ways. The third level corresponds to a carrier market profile, which includes preferences for customers of a carrier in selected markets. The second level corresponds to a carrier profile which is used for a specific carrier nationwide. The first level corresponds to a default profile applied to all calls lacking any other profiles.

In this illustrative embodiment, the hierarchical relationship of the profiles requires that, barring any restriction, preferences in a profile at a relatively high level take precedence over those preferences conflicting therewith in a profile at a relatively low level. Thus, in the case where a carrier defines a carrier profile (at the second level) for all its subscribers, which applies to all of their calls, and one of the subscribers also defines his/her own personal profile (at the seventh level), preferences in the personal profile accordingly override any conflicting preferences in the carrier profile. The resulting profile, generated by processor 2825 of gateway 321, is a reconciled profile which contains non-conflicting preferences from the profiles at different levels and is used by the clients and operator to provide information assistance and services to the user.

The foregoing merely illustrates the principles of the invention. It will thus be appreciated that those skilled in the art will be able to devise numerous other arrangements which embody the principles of the invention and are thus within its spirit and scope.

For example, in the disclosed embodiment, the master copy of the profiles is stored in profile manager 2805 which is coupled to messaging server 2807 for realizing electronic content deliveries. It will be appreciated that multiple profile managers similar to profile manager 2805 and multiple messaging servers similar to messaging server 2807 may be geographically distributed. In that case, each manager sends, to the gateway in each information/call center, a control signal indicating the current load of the manager and/or its connected messaging server. In response to such a control signal, the gateway efficiently routes requests for profiles (content delivery) to those managers (massaging servers) experiencing a lesser load.

In addition, a user may specify in a profile his/her preferred types of events and areas of interest, e.g., selected music, fashion and sports events, for which the user would like to receive information from time to time. Thus, based on one such profile, a server, e.g., server 28, tailors the content of the information delivered automatically to the user to suit his/her interest as soon as the information becomes available. For instance, the user may specify in the profile that he/she is a fan of a particular professional basketball team, and would like to purchase tickets to attend the games played by the team in the city where he/she lives. The user may further specify his/her seating preferences in such games. Based on such profile information, the server from time to time initiates communications to the user's communication device, and thus to the user, informing the user of the schedule of the upcoming games of interest and the availability of the preferred seats ahead of the game times. In the case where tickets may be purchased electronically, on learning such information, the user may also utilize the communication device to purchase any game ticket on line. Otherwise, the user may reserve tickets through an agent or a service, e.g., the TeleConcierge® service. Similarly, the user may specify his/her favorable products, services, manufacturers, and merchants in his/her profile. In response, the server from time to time communicates to the user any sales and advertising information concerning such products, services, manufacturers and merchants.

Finally, information/call center 100 is disclosed herein in a form in which various functions are performed by discrete functional blocks. However, any one or more of these functions could equally well be embodied in an arrangement in which the functions of any one or more of those blocks or indeed, all of the functions thereof, are realized, for example, by one or more appropriately programmed processors.

What is claimed is:

1. A directory system for use by a user to protect the privacy of selected telephone numbers in a directory, the system comprising:

a memory configured to:
store, in a directory associated with a first party, information comprising at least a selected telephone number to be used to contact a second party different from the first party;

a first interface configured to:
receive from the first party a request to designate the selected telephone number as a number that is to be disclosed only to a first predetermined group of persons;

a processor configured to:
store in the directory, in association with the selected telephone number, an indicator that indicates that the selected telephone number is only to be disclosed to members of the first predetermined group of persons; and a second interface configured to:
receive from a third party associated with a calling telephone number a request for the selected telephone number;

wherein the processor is further configured to:
locate the selected telephone number, in response to the request;

determine whether the indicator is stored in the directory in association with the selected telephone number; and if the indicator is stored in the directory in association with the selected telephone number:

determine an identity of the third party;

determine whether the third party is a member of a second predetermined group of persons that includes the first predetermined group of persons;

allow the third party to access the directory only if the third party is a member of the second predetermined group of persons and determine whether the third party is a member of the first predetermined group of persons, based at least in part on the identity;

the system further comprising:

a device configured to:

initiate communications between the second party and the third party; and a switching subsystem configured to:

establish a first communication connection to the selected telephone number, and a second communication connection to the calling telephone number, and for bridging the first communication connection to the second communication connection to realize the communications between the second party and the third party without providing the selected telephone number to the third party, if the third party is not a member of the first predetermined group of persons.

2. The system of claim 1 wherein the second communication connection includes a wireless connection.

3. The system of claim 1 wherein the directory is identified by the calling telephone number.

4. The system of claim 1 wherein the first interface includes a GUI.

5. A system for connecting a calling party to a called party comprising:

a memory configured to:

store, in a directory associated with a first party, information comprising at least a selected telephone number to be used to contact a second party different from the first party;

a first interface configure to:

receive from the first party a request to designate the selected telephone number as a number that is only to be disclosed to a predetermined group of persons;

a first processor configured to:

store in the directory, in association with the selected telephone number, an indicator that indicates that the selected telephone number is only to be disclosed to the predetermined group of persons;

a second interface configured to:

receive from a third party through a first communication link communications to an agent, the communications including a request for connecting the third party to the second party, the agent in response to the request causing an issuance of a call to the second party;

a second processor configured to:

establish a second communication link in issuing the call without disclosing the selected telephone number to the third party, if the third party is not a member of the predetermined group; and a device configured to:

receive from the third party at least one message for transmission to the second party for the second party to consider before answering the call; and a switch configured to:

bridge the first communication link to the second communication link.

6. The system of claim 5 wherein the agent is an operator.

7. The system of claim 5 wherein each of the first and second communication links is a telephone connection.

8. The system of claim 5 wherein the at least one message includes a display message.

9. The system of claim 5 wherein the at least one message includes information concerning a telephone number of a calling station from which the communications are sent, and an identity of a subscriber to the telephone number.

10. The system of claim 9 wherein the at least one message includes information concerning an identity of the third party different from the subscriber.

11. The system of claim 5 wherein the at least one message includes information concerning a telephone number for the second party to call back the third party.

12. The system of claim 5 wherein the at least one message includes information concerning a facsimile number.

13. The system of claim 5 wherein the at least one message includes information concerning an email address.

14. The system of claim 5 wherein the at least one message includes information concerning a content of the call.

15. The system of claim 5 wherein the at least one message is derived from the communications.

16. A method for providing a directory for a party, the method comprising:

receiving from a first party associated with a calling telephone number a request for a desired telephone number associated with a second party;

accessing a directory associated with a third party, the directory comprising one or more telephone numbers to be used to contact respective parties different from the third party and at least one indicator indicating that a respective telephone number is to be disclosed only to members of a first predetermined group of persons;

locating the desired telephone number in the directory;

determining whether an indicator is stored in the directory in association with the desired telephone number, indicating that the desired telephone number is to be disclosed only to members of the first predetermined group of persons;

if the indicator is stored in the directory in association with the desired telephone number:

determining an identity of the first party;

determining whether the first party is a member of a second predetermined group of persons that includes the first predetermined group of persons;

allowing the first party to access the directory only if the first party is a member of a second predetermined group of persons initiating communications between the first party and the second party;

establishing a first communication connection to the desired telephone number, and a second communication connection to the calling telephone number; and bridging the first communication connection to the second communication connection to realize the communications between the first party and the second party, without providing the desired telephone number to the first party, if it is determined that the first party is not a member of the first predetermined group of persons.

17. The method of claim 16 wherein the second communication connection includes a wireless connection.

18. The method of claim 16 wherein the directory is identified by the calling telephone number.

19. The method of claim 16 further comprising causing the first party to be on hold after the first communication connection is established.

20. A method for use in a system for connecting a calling party to a called party, the method comprising:

storing, in a directory associated with a first party, information comprising at least a selected telephone number to be used to contact a second party different from the first party;

receiving from the first party a request to designate the selected telephone number as a number that is only to be disclosed to a predetermined group of persons;

storing in the directory, in association with the selected telephone number, an indicator that indicates that the selected telephone number is only to be disclosed to the predetermined group of persons;

receiving from a third party through a first communication link communications to an agent, the communications including a request for connecting the third party to the second party, the agent in response to the request causing an issuance of a call to the second party;

establishing a second communication link in issuing the call without disclosing the selected telephone number to the third party, if the third party is not a member of the predetermined group;

receiving from the third party at least one message for transmission to the second party for the second party to consider before answering the call; and bridging the first communication link to the second communication link.

21. The method of claim 20 wherein the agent is an operator.

22. The method of claim 20 wherein each of the first and second communication links is a telephone connection.

23. The method of claim 20 wherein the at least one message includes a display message.

24. The method of claim 20 wherein the at least one message includes information concerning a telephone number of a calling station from which the communications are sent, and an identity of a subscriber to the telephone number.

25. The method of claim 24 wherein the at least one message includes information concerning an identity of the third party different from the subscriber.

26. The method of claim 20 wherein the at least one message includes information concerning a telephone number for the second party to call back the third party.

27. The method of claim 20 wherein the at least one message includes information concerning a facsimile number.

28. The method of claim 20 wherein the at least one message includes information concerning an email address.

29. The method of claim 20 wherein the at least one message includes information concerning a content of the call.

30. The method of claim 20 wherein the at least one message is derived from the communications.

31. The directory system of claim 1, wherein the processor is further configured to:

determine an access right of the third party with respect to the directory; and determine whether the third party has a right to receive the second telephone number based, at least in part, on the access right.

32. The system of claim 1, wherein: the second interface is further configured to:

receive a call from the third party; and receive call set-up signals, including an identifier, during the call; and wherein the processor is further configured to:

determine an identity of the third party based, at least in part, on the identifier.

33. A directory system for use by a user to protect the privacy of selected telephone numbers in a directory, the system comprising:

an interface configured to:

receive from a calling party associated with a calling telephone number a request for a selected telephone number associated with a second party;

a processor configured to:

locate, in a directory identified by the calling telephone number, the selected telephone number and information indicating that the selected telephone number is to be disclosed only to members of a first predetermined group of persons;

determine an identity of the calling party;

determine whether the calling party is a member of a second predetermined group of persons that includes the first predetermined group of persons;

allow the calling party to access the directory only if the calling party is a member of the second predetermined group of persons and determine whether the calling party has a right to receive the selected telephone number based, at least in part, the information and the identity of the calling party;

a device configured to:

initiate communications between the calling party and the second party; and a switching subsystem configured to:

establish a first communication connection to the selected telephone number, and a second communication connection to the calling telephone number, and for bridging the first communication connection to the second communication connection to realize the communications between the calling party and the second party without providing the selected telephone number to the calling party, if the calling party has no right to receive the selected telephone number.

* * * * *